US008260684B2

(12) United States Patent
Flusser et al.

(10) Patent No.: US 8,260,684 B2
(45) Date of Patent: Sep. 4, 2012

(54) SYSTEM AND METHOD FOR COORDINATING AND EVALUATING APPAREL

(75) Inventors: Alan Flusser, New York, NY (US); Christian Bruck, New York, NY (US)

(73) Assignee: Bespeak Inc., New York, NY (US)

( * ) Notice: Subject to any disclaimer, the term of this patent is extended or adjusted under 35 U.S.C. 154(b) by 0 days.

(21) Appl. No.: 12/897,774

(22) Filed: Oct. 4, 2010

(65) Prior Publication Data
US 2011/0082764 A1    Apr. 7, 2011

Related U.S. Application Data

(60) Provisional application No. 61/248,132, filed on Oct. 2, 2009.

(51) Int. Cl.
*G06Q 30/00* (2006.01)
(52) U.S. Cl. ........................ 705/26.7; 705/26.1
(58) Field of Classification Search .................. 705/26.7
See application file for complete search history.

(56) References Cited

U.S. PATENT DOCUMENTS

| | | | |
|---|---|---|---|
| 7,089,216 B2* | 8/2006 | Van Overveld | 706/12 |
| 7,346,561 B1* | 3/2008 | Devitt et al. | 705/26.61 |
| 7,398,231 B2* | 7/2008 | Wan et al. | 705/26.7 |
| 7,584,122 B2* | 9/2009 | Kozinn | 705/26.5 |
| 2003/0226266 A1* | 12/2003 | Ellis | 33/17 R |
| 2007/0143679 A1* | 6/2007 | Resner | 715/706 |
| 2008/0163344 A1* | 7/2008 | Yang | 726/4 |
| 2008/0297515 A1* | 12/2008 | Bliss | 345/473 |
| 2009/0157479 A1* | 6/2009 | Caldwell et al. | 705/10 |
| 2010/0023421 A1* | 1/2010 | Wannier et al. | 705/26 |
| 2010/0023426 A1* | 1/2010 | Wannier et al. | 705/27 |
| 2010/0030578 A1* | 2/2010 | Siddique et al. | 705/3 |
| 2010/0076819 A1* | 3/2010 | Wannier et al. | 705/10 |
| 2010/0313141 A1* | 12/2010 | Yu et al. | 715/747 |
| 2011/0035339 A1* | 2/2011 | Wilson | 705/500 |
| 2011/0184831 A1* | 7/2011 | Dalgleish | 705/26.7 |
| 2011/0184832 A1* | 7/2011 | Wannier et al. | 705/26.7 |
| 2012/0116917 A1* | 5/2012 | Saul et al. | 705/26.7 |

OTHER PUBLICATIONS

Closet Assistant attempts easy Web wardrobe management, social networking for turtlenecks (Posted Jan. 2, 2008 by Josh Lowensohn).*

* cited by examiner

*Primary Examiner* — Bradley B. Bayat
(74) *Attorney, Agent, or Firm* — IM IP Law PLLC; C. Andrew Im

(57) ABSTRACT

A computer implemented method and system for coordinating and evaluating apparel/accessory items. The system comprises a processor based client device and a processor based server. The client device receives information about an apparel/accessory item for coordination from a user. The server receives the information about the apparel/accessory item from the client device over a communications network. The server calculates a coordination score of the apparel/accessory item by applying a plurality of predetermined rules to determine if the apparel/accessory item coordinates with one or more apparel/accessory items in the virtual wardrobe. The server transmits a recommendation of one or more apparel/accessory items in said virtual wardrobe based on the coordination score. The virtual wardrobe can be user's apparels/accessories or a retailer's stock of apparels/accessories for sale.

47 Claims, 14 Drawing Sheets

MATRIX 1 (M1) = Profile 1

200

> Contrast Type Muted Tonal - MT -
>> Blond hair (No. 7 out of 'Hair color chart' No. 7 out of 8)
>> Fair slightly ruddy skin (No. 2 from 'Skin color chart' out of 10 choices)
>> Eyes blue (No. 3 from 'Eye color chart' out of 6 choices)
> Shoulders & hips same width (No. 2 from 'Body type chart' out of 3 choices)
> Long neck (No. 1 from 'Neck type chart' out of 3 choices)
> Average face shape (No. 2 from 'Face type chart' out of 3 choices)
> Size 190 cm tall
> Weight 100kg

250

> Base Color 'Light Blue': Color No. X belongs to
1) subset MT (Muted — Tonal) from all 206 websafe colors which constitute the total set of colors
2) subset 'Monochromatic' harmony from all colors > Accent Color 1 'Light Pink': Color No. Y belongs to
1) subset MT (Muted — Tonal) from all 206 websafe colors which constitute the total set of colors
2) subset 'Complementary' harmony from all colors > Pattern 'Medium Regular diagonal' (Pattern No. Z from 'Pattern Types' out of a total 20 possible pattern types) belongs to subset of all patterns compatible with all body types.

> Tie width: wide (No. 2 from 'Tie width chart' out of two choices)
> Tie length: long (No. 2 from 'Tie length chart' out of two choices)

> Base Color 'Pale Blue': Color No. X belongs to
1) subset MT (Muted — Tonal) from all 206 websafe colors which constitute the total set of colors
2) subset 'Monochromatic' harmony from all colors > shirt collar height 'high' (No. 2 from 'Collar height chart' out of 2 choices) > shirt collar spread 'average' (No. 2 from 'Collar spread chart' out of 3 choices)
> shirt collar point length 'average' (No. 2 from 'Collar point length out of 3 choices)

Apply M2 (Color TIE) to M1 (Profile) — 410
Score 1 (out of 5, where 1 is highest) for Base Color
  (*because it belongs to MT color group*)
+ Score 1 for Accent Color
  (*because it belongs to MT color group*)
+ Score 1 for 'Complexion Color repeated rule'
  (*bonus score because the eye color is blue*)
= TOTAL AVERAGE SCORE M2TIE x M1 EQUALS '1'

Apply M2 (Color SHIRT) to M1 (Profile) — 420
Score 1 (out of 5, where 1 is highest) for Base Color
  (*because it belongs to MT color group*)
= TOTAL AVERAGE SCORE M2SHIRT x M1 EQUALS '1'

Apply M4 (Special TIE) to M1 (Profile) — 430
Score 1 (out of 5, where 1 is highest) for Tie Width
  (*because wide tie coordinates perfectly with body, neck and face types*)
+ Score 1 for Tie Length
  (*because long tie coordinates with tall body height*)
= TOTAL AVERAGE SCORE M4 x M1 EQUALS '1'

Apply M5 (Special SHIRT) to M1 (Profile)
Score 1 (out of 5, where 1 is highest) for Collar Height
  (*because high collar coordinates perfectly with neck and face types*)
+ Score 1 for Collar point length
  (*because average collar point length coordinates perfectly with neck and face and body types*)
+ Score 1 for Collar spread
  (*because average collar spread coordinates perfectly with neck & face types*)
= TOTAL AVERAGE SCORE M5 x M1 EQUALS '1'

450

Apply M6 (Pattern) to M1 (Profile)
Score 1 (medium pattern is never mismatch for any body size)
  (*because average pattern coordinates perfectly with neck & face & body types*)
= SCORE M6 x M1 EQUALS '1'

Apply M6 (Pattern) to SHIRT x TIE
No score because only one pattern
  (*no pattern coordination required*)
= TOTAL N.A.

460

Apply M2 (Color) to coordinate TIE & SHIRT colors against each other
Score 1 (out of 5, where 1 is highest) for Color Coordination
  (*because all colors of each piece belong to 'monochromatic' harmony color subgroup, i.e. they obey one of the 6 rules of color coordination ranges available, each being defined by a subgroup taken from all possible colors.*)
= SCORE M2 x M2 EQUALS '1'

470

OVERALL TOTAL AVERAGE SCORE 2 ITEMS & PROFILE
= SUM OF ALL SCORES DIVIDED BY NUMBER OF SCORES (6)
= '1' (excellent)

[(M2TIE x M1) + (M2SHIRT x M1) + (M4 x M1) + (M5xM1) + (M6 x M1) + (M2 x M2)] / 6 = 1

FIG. 3C

> Base Color 'Primary bright Yellow: Color No. X belongs to
1) subset HC (High Contrast) but NOT to subset MT (Muted — Tonal) from all 206 websafe colors which constitute the total set of colors)
2) subset 'Complementary' but NOT subset 'Monochromatic' harmony from all colors
> Accent Color 'Primary bright Red: Color No. M belongs to
1) subset HC (High Contrast) but NOT to subset MT (Muted — Tonal) from all 206 websafe colors which constitute the total set of colors)
2) subset 'Complementary' but NOT subset 'Monochromatic' harmony from all colors > pattern 'very large dotted diagonal' (No. N from 'Pattern Types' out of a total 20 possible pattern types) does kind of coordinate with large body type.
> jacket lapel width average (No. 1 from 'Lapel width chart' out of 2 choices)

— 475

Apply M2 (Color JACKET) to M1 (Profile)
Score 5 (out of 5, where 1 is highest) for Base Color
  (*because it does not belong to MT color group*)
+ Score 5 for Accent Color
  (*because it does not belong to MT color group*)
+ No Score for 'Complexion Color repeated rule'
  (*bonus score NOT applicable*)
= TOTAL AVERAGE SCORE M2JACKET x M1 EQUALS '5' ("BURN IT")

476

Apply M6 (Pattern) to JACKET x TIE
Score 4 (out of 5, where 1 is highest) for Pattern Coordination
(*because patterns are distinctly not of the same scale which is against the recommended rule for 2 similar patterns*)
= SCORE '4' ("NOT GOOD")

Apply M2 (Color) to coordinate TIE & JACKET colors against each other
Score 1 (out of 5, where 1 is highest) for Color Coordination
(*Color clash High Contrast jacket colors vs. MT tie colors.*)
= SCORE M2 x M2 EQUALS '5' — 490

Apply M2 (Color) to coordinate SHIRT & JACKET colors against each other
Score 5 (out of 5, where 1 is highest) for Color Coordination
(*Color clash High Contrast jacket colors vs. MT shirt colors.*)
= SCORE M2 x M2 EQUALS '5' — 495

Apply M3 (Special JACKET) to M1 (Profile)
Score 3 (out of 5, where 1 is highest) for Lapel Width
(*because lapel should be wide to better coordinate with body proportions*)
= TOTAL AVERAGE SCORE M3 x M1 EQUALS '3' — 500

OVERALL TOTAL AVERAGE SCORE 3 ITEMS & PROFILE
= SUM OF ALL SCORES (28) DIVIDED BY NUMBER OF SCORES (11)
= '2.55' = '4' (bad) — 510

[(M2TIE x M1) + (M2SHIRT x M1) + (M4 x M1) + (M5xM1) + (M6 x M1) + (M2 x M2) + (M2JACKET x M1) + M6 + (M2JACKET x M2TIE) + (M2JACKET x M2 SHIRT) + (M3 x M1)] / 11 = 2.55

600

> Base Color should ideally belong to MT Color sub group (for this profile MT)
> Accent Color should belong to MT group
> Accent Color should ideally be one of the complexion colors (tan, or blue, skin pink)
> Lapel should be wide
> Pattern should be one of the following (small diagonal or large dotted i.e. a subset of the pattern palette of 20 possible).

FIG. 3E

SYSTEM AND METHOD FOR COORDINATING AND EVALUATING APPAREL

RELATED APPLICATION

This application claims priority to U.S. Provisional Patent Application No. 61/248,132 filed Oct. 2, 2009, which is incorporated herein by reference in its entirety.

FIELD OF THE INVENTION

The claimed invention is directed to a computer-based system and method for coordinating apparel. More particularly, the claimed invention relates to an innovative system and method that allows a user to evaluate and coordinate apparel based on individual characteristics (a profile), characteristics of the apparel, or combinations of both.

OBJECT AND SUMMARY OF THE INVENTION

Applicant is unaware of any computer-based system, application and method for coordinating and evaluating apparel personalized for a specific individual based on the individual's unique physical characteristics.

The inventive system and method has many benefits including but not limited to:

- Providing a rapid means of evaluating whether an apparel item of interest coordinates well with an individual, other apparel items, or both;
- Providing a versatile system that allows the coordination of new apparel items with items already stored in the system;
- Providing a coordination system that considers the particulars of an individual's body coloring and proportions when providing a coordination assessment;
- Providing a versatile system that is ready-to-use in virtually any place and at virtually any time;
- Providing a systematic explanation for a recommendation meant to compliment a user's specific characteristics;
- Providing a system that can be independent of apparel sizing charts and systems, body measurements, or independent body scanning;
- Providing a system that allows on-the-go selection and evaluation of apparel items for third party profiles, (that is, a user can shop for apparel (and have it evaluated) for another individual, based on the individual's profile in the system);
- Providing a system that can be independent of the physical presence of the profiled individual;
- Providing a system that allows the storage of any apparel item for later reference and coordination;
- Providing a system that is useful for the selection of apparel items from an existing wardrobe as well as based on new items of interest.

The user may use the inventive system and method in alternate ways including but not limited to:

Seeking shopping or dressing guidance for specific apparel. In one exemplary embodiment of the claimed invention, the user specifies the features of a particular apparel or accessory item (such as but not limited to a piece of clothing) by using either feature extraction from a digital photograph of the item taken and/or by manual input of all or part of those features, for example, by way of pre-defined multiple choice options. The features include but are not limited to the colors of the item, pattern, and some specific dimensions of the item such as but not limited to, the width and length of the item. The system then processes the input and offers a recommendation on how well the item under consideration suits the individual profile and potential other pieces of apparel.

Seeking shopping or dressing guidance in general. In one exemplary embodiment of the claimed invention, the user specifies a profile and the type of apparel she intends to seek out in a store or in an existing wardrobe (either as a standalone item or in relation to other pieces of apparel she may input or select from information already stored in the system). The system then processes the input from the user and offers guidance and directive recommendations as to what range of colors and dimensions the user should seek in order to identify the apparel that coordinates best with the profile.

Coordinating clothes independently of a profile. In another exemplary embodiment of the claimed invention, the system is able to evaluate, guide, and recommend how characteristics, such as colors, patterns, and proportions of several pieces of apparel and/or accessory items (collectively referred to herein as "apparel items") coordinate best without needing to consider the profile of a specific individual. In accordance with an exemplary embodiment of the claimed invention, when a user selects an apparel item (e.g., a shirt), the user can invoke the system without utilizing the user profile to recommend an accompanying apparel and/or accessory item (s) (e.g., suits, ties, belts, socks, etc.) that would be stylish and tasteful (coordinate) with the selected shirt or suit. Of course, if the user invokes the system to utilize the user profile, the system would provide a specific list of apparel/accessory item(s) that would coordinate well with the selected shirt given user's characteristics. In accordance with an aspect of the claimed invention, an apparel retailer can utilize this embodiment of the claimed invention to offer recommendation of accompanying apparel/accessory items to a customer purchasing an apparel item from its store or website.

Enhancing an existing wardrobe. In another exemplary embodiment of the claimed invention, the system can guide and enable users to coordinate existing wardrobes in part or entirely in a personalized fashion meant to compliment unique individual profiles. The wardrobe information can be stored in the system, such as a database system that communicates with the system servers. The system can then the provide the user with specific recommendations on what coordinates best with a given profile and what additional items should be sought out or acquired to enhance the entire wardrobe.

Sharing style and personalized fashion information and opinions. In yet another exemplary embodiment of the claimed invention, the inventive system provides a platform (such as a blog page), where a user or a user community can share style opinions, personalized fashion information opinions, or opinions on fashion in general.

In accordance with an exemplary embodiment of the claimed invention, a computer implemented method for coordinating and evaluating apparel/accessory items receives information about an apparel/accessory item for coordination from a user, calculates a coordination score of the apparel/accessory item by applying a plurality of predetermined rules to determine if the apparel/accessory item coordinates with one or more apparel/accessory items in a virtual wardrobe, and provides a recommendation of one or more apparel/accessory items in the virtual wardrobe based on the coordination score. The virtual wardrobe can be user's apparels/accessories or a retailer's stock of apparels/accessories for sale.

In accordance with an exemplary embodiment of the claimed invention, the method aforesaid further determines whether the apparel/accessory item compliments the user based on a profile of the user. The profile comprises at least one of the following user's characteristics: facial complexion, body proportions, skin color, skin tone, face shape, neck shape, neck length, height, weight, shoulder to waist ratio, shoulder to hip ratio, shoulder slope, hair color and eye color.

In accordance with an exemplary embodiment of the claimed invention, the virtual wardrobe comprises apparel/accessory items for sale on a retailer's website and the aforesaid method receives the apparel/accessory item selected by the user on the retailer's website.

In accordance with an exemplary embodiment of the claimed invention, a processor based server associated with the retailer's website communicates with a client device associated with the user over a communications network and transmits the recommendation of one or more apparel/accessory items to the client device.

In accordance with an exemplary embodiment of the claimed invention, the aforesaid method determines whether one or more apparel/accessory items from the retailer's website compliment the user based on a profile of the user. The profile comprises at least one of the following user's characteristics: facial complexion, body proportions, skin color, skin tone, face shape, neck shape, neck length, height, weight, shoulder to waist ratio, shoulder to hip ratio, shoulder slope, hair color and eye color.

In accordance with an exemplary embodiment of the claimed invention, the server transmits a plurality of questions to generate the profile of the user to the client device over the communications network, receives answers entered on the client device by the user to the plurality of questions from the client device over the communications network, and stores the received answers to the plurality of questions in a database.

In accordance with an exemplary embodiment of the claimed invention, the aforesaid method calculates the coordination score by applying at least one of the following rules: a profile contrast rule, a profile proportions rule, an apparel color rule and an apparel pattern rule.

In accordance with an exemplary embodiment of the claimed invention, the aforesaid method calculates coordination scores of two apparel/accessory items to determine whether the two apparel/accessory items coordinate with each other.

In accordance with an exemplary embodiment of the claimed invention, the aforesaid method receives information about the apparel/accessory item entered on a client device by the user.

In accordance with an exemplary embodiment of the claimed invention, the aforesaid method receives entered information from the client device over a communications network by a processor based server and stores the entered information in a database.

In accordance with an exemplary embodiment of the claimed invention, the aforesaid method receives a digital photograph of the apparel/accessory item, and a process of a client device extracts features of the apparel/accessory item from the digital photograph.

In accordance with an exemplary embodiment of the claimed invention, the aforesaid method extracts from the digital photograph at least one of the following features of said apparel/accessory item: color, pattern, texture, length and width.

In accordance with an exemplary embodiment of the claimed invention, the aforesaid method receives a digital photograph of the apparel/accessory item by a processor based server from a digital camera of a client device over a communications network. The server extracts the features of the apparel/accessory item from the digital photograph.

In accordance with an exemplary embodiment of the claimed invention, the aforesaid method receives answers from the user to a plurality of questions to generate the profile of the user, and stores received answers to the plurality of questions in a storage device of a client device associated with the user.

In accordance with an exemplary embodiment of the claimed invention, the aforesaid method generates a profile of another person to coordinate and evaluate apparel/accessory items in a virtual wardrobe associated with the other person, and stores the profile of the other person in the storage device of the client device associated with the user.

In accordance with an exemplary embodiment of the claimed invention, the aforesaid method transmits a plurality of questions to a client device associated with said user to generate said profile of said user over a communications network by a processor based server; and receiving answers entered on said client device by said user to said plurality of questions over said communications network by said server; and storing received answers to the plurality of questions in a database.

In accordance with an exemplary embodiment of the claimed invention, a client device associated with the user generates the virtual wardrobe of the user based on information received relating to a plurality of apparel/accessory items of the user, and the aforesaid method stores the virtual wardrobe in the storage device of the client device.

In accordance with an exemplary embodiment of the claimed invention, the aforesaid method receives answers from the user to a plurality of questions to generate the virtual wardrobe, and stores the received answers to the plurality of questions in the storage device of the client device.

In accordance with an exemplary embodiment of the claimed invention, a process based server generates the virtual wardrobe of the user based on information received relating to a plurality of apparel/accessory items of the user from a client device associated with the user over a communications network, and the aforesaid method stores the virtual wardrobe in a database.

In accordance with an exemplary embodiment of the claimed invention, the server transmits a plurality of questions to the client device to generate the virtual wardrobe over the communications network by said server, and receives answers entered on the client device by the user to the plurality of questions from the client device over said communications network. The aforesaid method stores received answers to the plurality of questions in the database.

In accordance with an exemplary embodiment of the claimed invention, the aforesaid method stores the apparel/accessory item in the virtual wardrobe associated with the user if the apparel/accessory item is acquired by the user.

In accordance with an exemplary embodiment of the claimed invention, the aforesaid method provides a sliding coordination score and a summary based on the coordination score to the user.

In accordance with an exemplary embodiment of the claimed invention, the server searches Internet or third-party database for an accompanying apparel/accessory item that coordinates with one or more apparel/accessory items in the virtual wardrobe of the user and transmits the accompanying apparel/accessory item to the client device over the communications network.

In accordance with an exemplary embodiment of the claimed invention, the server searches Internet or third-party database for an accompanying apparel/accessory item that compliments the user based on the profile of the user and transmits the accompanying apparel/accessory item to the client device over the communications network by the server.

In accordance with an exemplary embodiment of the claimed invention, a non-transitory computer readable medium comprises computer executable code for coordinating and evaluating apparel/accessory items. The comprises instructions for receiving information about an apparel/accessory item for coordination from a user, calculating a coordination score of the apparel/accessory item by applying a plurality of predetermined rules to determine if the apparel/accessory item coordinates with one or more apparel/accessory items in a virtual wardrobe, and providing a recommendation of the one or more apparel/accessory items in the virtual wardrobe based on the coordination score. The virtual wardrobe can be user's apparels/accessories or a retailer's stock of apparels/accessories for sale.

In accordance with an exemplary embodiment of the claimed invention, the aforesaid code comprises instructions for determining whether the apparel/accessory item compliments the user based a profile of the user, the profile comprising at least one of the following user's characteristics: facial complexion, body proportions, skin color, skin tone, face shape, neck shape, neck length, height, weight, shoulder to waist ratio, shoulder to hip ratio, shoulder slope, hair color and eye color.

In accordance with an exemplary embodiment of the claimed invention, wherein the virtual wardrobe comprises apparel/accessory items for sale on a retailer's website, and the aforesaid code further comprises instructions for receiving the apparel/accessory item selected by the user on the retailer's website.

In accordance with an exemplary embodiment of the claimed invention, the aforesaid code further comprises instructions for communicating with a client device associated with the user over a communications network by a processor based server associated with the retailer's website; and transmitting the recommendation of the one or more apparel/accessory items to the client device associated with the user.

In accordance with an exemplary embodiment of the claimed invention, the aforesaid code further comprises instructions for determining whether the one or more apparel/accessory items from the retailer's website compliment the user based on a profile of the user, the profile comprising at least one of the following user's characteristics: facial complexion, body proportions, skin color, skin tone, face shape, neck shape, neck length, height, weight, shoulder to waist ratio, shoulder to hip ratio, shoulder slope, hair color and eye color.

In accordance with an exemplary embodiment of the claimed invention, the aforesaid code further comprises instructions for transmitting a plurality of questions to generate the profile of the user to the client device over the communications network by the server; receiving answers entered on the client device by the user to the plurality of questions from the client device over the communications network by the server; and storing received answers to the plurality of questions in a database.

In accordance with an exemplary embodiment of the claimed invention, the aforesaid code further comprises instructions for calculating the coordination score by applying at least one of the following rules: a profile contrast rule, a profile proportions rule, an apparel color rule and an apparel pattern rule.

In accordance with an exemplary embodiment of the claimed invention, the aforesaid code further comprises instructions for calculating coordination scores of two apparel/accessory items to determine whether the two apparel/accessory items coordinate with each other.

In accordance with an exemplary embodiment of the claimed invention, the aforesaid code further comprises instructions for receiving information about the apparel/accessory item entered on a client device associated with the by the user.

In accordance with an exemplary embodiment of the claimed invention, the aforesaid code further comprises instructions for transmitting entered information to a processor based server for processing and storage in a database over a communications network by the client device.

In accordance with an exemplary embodiment of the claimed invention, the aforesaid code further comprises instructions for receiving a digital photograph of the apparel/accessory item and extracting features of the apparel/accessory item from the digital photograph by a processor of the client device.

In accordance with an exemplary embodiment of the claimed invention, the aforesaid code further comprises instructions for extracting form the digital photograph at least one of the following features of the apparel/accessory item: color, pattern, texture, length and width.

In accordance with an exemplary embodiment of the claimed invention, the aforesaid code further comprises instructions for transmitting a digital photograph of the apparel/accessory item to a processor based server for extracting features of the apparel/accessory item from the client device over a communications network.

In accordance with an exemplary embodiment of the claimed invention, the aforesaid code further comprises instructions for receiving answers from the user to a plurality of questions to generate the profile of the user; and storing received answers to the plurality of questions in a storage device of a client device associated with the user.

In accordance with an exemplary embodiment of the claimed invention, the aforesaid code further comprises instructions for generating a profile of another person to coordinate and evaluate apparel/accessory items in the virtual wardrobe associated with the other person; and storing the profile of the other person in the storage device of the client device associated with the user.

In accordance with an exemplary embodiment of the claimed invention, the aforesaid code further comprises instructions for receiving a plurality of questions to generate the profile of the user from a processor based server over a communications network by a client device associated with the user; transmitting answers entered on the client device by the user to the plurality of questions to the server for processing and storage in a database over the communications network by the client device.

In accordance with an exemplary embodiment of the claimed invention, the aforesaid code further comprises instructions for generating the virtual wardrobe of the user by a client device associated with the user based on information received relating to a plurality of apparel/accessory items of the user; and storing the virtual wardrobe in the storage device of the client device.

In accordance with an exemplary embodiment of the claimed invention, the aforesaid code further comprises instructions for receiving answers from the user to a plurality of questions to generate the virtual wardrobe of the user by the client device; and storing received answers to the plurality of questions in the storage device of the client device.

In accordance with an exemplary embodiment of the claimed invention, the aforesaid code further comprises instructions for transmitting information relating to a plurality of apparel/accessory items of the user to a processor based server to generate and store the virtual wardrobe of the user in a database over a communication network by a client device associated with the user.

In accordance with an exemplary embodiment of the claimed invention, the aforesaid code further comprises instructions for receiving a plurality of questions from the server over the communications network by the client device; and transmitting answers entered on the client device by the user to the plurality of questions to the server for processing and storing in the database over the communications network by the client device.

In accordance with an exemplary embodiment of the claimed invention, the aforesaid code further comprises instructions for storing the apparel/accessory item in the virtual wardrobe associated with the user if the apparel/accessory item is acquired by the user.

In accordance with an exemplary embodiment of the claimed invention, the aforesaid code further comprises instructions for providing a sliding coordination score and a summary based on the coordination score to the user.

In accordance with an exemplary embodiment of the claimed invention, the aforesaid code further comprises instructions for receiving an accompanying apparel/accessory item that coordinates with the one or more apparel/accessory items in the virtual wardrobe from the server over the communications network by the client device, the accompanying apparel/accessory item selected from a third-party database or an Internet search by the server.

In accordance with an exemplary embodiment of the claimed invention, the aforesaid code further comprises instructions for receiving an accompanying apparel/accessory item that compliments the user based on the profile of the user from the server over the communications network by the client device, the accompanying apparel/accessory item selected from a third-party database or an Internet search by the server.

In accordance with an exemplary embodiment of the claimed invention, a system and method for coordinating and evaluating apparel/accessory items comprises a processor based client device and a processor based server. The client device receives information about an apparel/accessory item for coordination from a user. The server receives the information about the apparel/accessory item from the client device over a communications network. The server calculates a coordination score of the apparel/accessory item by applying a plurality of predetermined rules to determine if the apparel/accessory item coordinates with one or more apparel/accessory items in the virtual wardrobe. The server transmits a recommendation of one or more apparel/accessory items in said virtual wardrobe based on the coordination score. The virtual wardrobe can be user's apparels/accessories or a retailer's stock of apparels/accessories for sale.

In accordance with an exemplary embodiment of the claimed invention, the aforesaid server determines whether the apparel/accessory item compliments the user based a profile of the user. The profile comprises at least one of the following user's characteristics: facial complexion, body proportions, skin color, skin tone, face shape, neck shape, neck length, height, weight, shoulder to waist ratio, shoulder to hip ratio, shoulder slope, hair color and eye color.

In accordance with an exemplary embodiment of the claimed invention, the aforesaid virtual wardrobe comprises apparel/accessory items for sale on a retailer's website and the client device transmits the apparel/accessory item selected by the user on the retailer's website to the server.

In accordance with an exemplary embodiment of the claimed invention, the aforesaid server is associated with the retailer's website and transmits the recommendation of the one or more apparel/accessory items from the retailer's website to the client device over the communications network.

In accordance with an exemplary embodiment of the claimed invention, the aforesaid server determines whether the one or more apparel/accessory items from the retailer's website compliment the user based on a profile of the user. The profile comprising at least one of the following user's characteristics: facial complexion, body proportions, skin color, skin tone, face shape, neck shape, neck length, height, weight, shoulder to waist ratio, shoulder to hip ratio, shoulder slope, hair color and eye color.

In accordance with an exemplary embodiment of the claimed invention, the aforesaid server transmits a plurality of questions to generate the profile of the user to the client device over the communications network and receives answers entered on the client device by the user to the plurality of questions from the client device over the communications network. A database stores received answers to the plurality of questions.

In accordance with an exemplary embodiment of the claimed invention, the aforesaid server calculates the coordination score by applying at least one of the following rules: a profile contrast rule, a profile proportions rule, an apparel color rule and an apparel pattern rule.

In accordance with an exemplary embodiment of the claimed invention, the aforesaid server calculates coordination scores of two apparel/accessory items to determine whether the two apparel/accessory items coordinate with each other.

In accordance with an exemplary embodiment of the claimed invention, the aforesaid server receives information about the apparel/accessory item entered on the client device by the user from the client device over a communications network, and a database stores the entered information.

In accordance with an exemplary embodiment of the claimed invention, the aforesaid server receives a digital photograph of the apparel/accessory item from a digital camera of the client device over the communications network and extracts features of the apparel/accessory item from the digital photograph.

In accordance with an exemplary embodiment of the claimed invention, the aforesaid server extracts from the digital photograph at least one of the following features of the apparel/accessory item: color, pattern, texture, length and width.

In accordance with an exemplary embodiment of the claimed invention, the aforesaid server transmits a plurality of questions to the client device to generate the profile of the user over the communications network and receives answers entered on the client device by the user to the plurality of questions over the communications network. The aforesaid system further comprises a database for storing received answers to the plurality of questions.

In accordance with an exemplary embodiment of the claimed invention, the aforesaid server generates the virtual wardrobe of the user based on information received relating to a plurality of apparel/accessory items of the user from the client device over the communications network, and the aforesaid system further comprises a database for storing the virtual wardrobe.

In accordance with an exemplary embodiment of the claimed invention, the aforesaid client device receives a plurality of questions from the server over the communications network and transmits answers entered on the client device by the user to the plurality of questions to the server for generating the virtual wardrobe of the user based on the answers. The aforesaid database stores answers and the virtual wardrobe in the database.

In accordance with an exemplary embodiment of the claimed invention, the aforesaid server stores the apparel/accessory item in the virtual wardrobe of the user if the apparel/accessory item is acquired by the user.

In accordance with an exemplary embodiment of the claimed invention, the aforesaid client device receives a sliding coordination score and a summary based on the coordination score from the server over the communications network.

In accordance with an exemplary embodiment of the claimed invention, the aforesaid server searches Internet or third-party database for an accompanying apparel/accessory item that coordinates with the one or more apparel/accessory items in the virtual wardrobe of the user and transmits the accompanying apparel/accessory item to the client device over the communications network.

In accordance with an exemplary embodiment of the claimed invention, the aforesaid server searches Internet or third-party database for an accompanying apparel/accessory item that compliments the user based on the profile of the user and transmits the accompanying apparel/accessory item to the client device over the communications network.

In accordance with an exemplary embodiment of the claimed invention, the aforesaid client device is a network enabled device comprising a digital camera.

In accordance with an exemplary embodiment of the claimed invention, the aforesaid client device is one of the following: a cell phone, a smartphone, a laptop, a netbook, a tablet PC, a mobile wireless device, a personal digital assistant (PDA).

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the claimed invention solely thereto, will best be understood in conjunction with the accompanying drawings in which:

FIGS. 3A-3E are high-level logical step charts illustrating exemplary processes for scoring coordination apparel potential in accordance with an exemplary embodiment of the claimed invention.

DETAILED DESCRIPTION OF THE EMBODIMENTS

Figure 1:
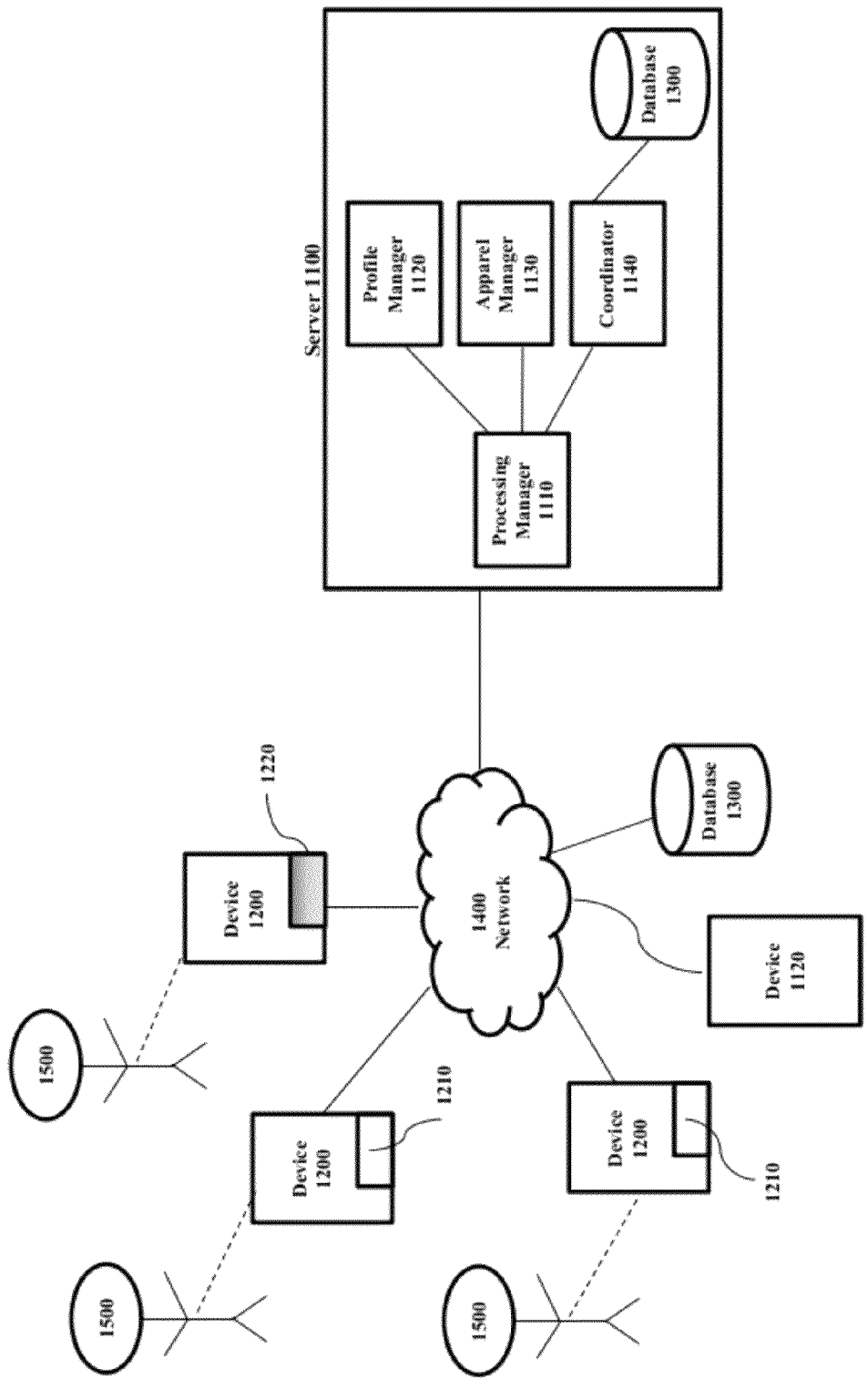
FIG. 1 is a network incorporating the system supporting the claimed invention and a block-diagram of the major aspects of said system according to an exemplary embodiment of the claimed invention.

The claimed invention is directed to an evaluation and coordination processing system that acts as a personal, portable stylist, that is capable of uniquely evaluating and coordinating apparel and accessories or combinations thereof in light of the characteristics of an individual, the characteristics of apparel items themselves, or a combination of both. Characteristics of an individual that may be considered by the system include but are not limited to: a person's facial complexion, body proportions, face shape, neck shape, shoulder to waist ratio, hair color, eye color, and the like. Characteristics of apparel or accessories that may be considered by the system include but are not limited to, the color, the patterns, the width, the length, and the like. According to one exemplary embodiment of the claimed invention, the system coordinates an item of apparel or accessory (collectively referred to herein as an "apparel") with an individual profile according to a set of rules from which it generates coordination scores. In another exemplary embodiment of the claimed invention, the inventive system allows users on-the-go to uniquely coordinate clothing, or other apparel or accessories, either with other apparel or with the characteristics of an individual as set forth in the individual profile. The system can generate coordination based on various factors including but not limited to: color, contrast, and proportion.

Generally, in accordance with an exemplary embodiment of the claimed invention, the application can be activated on a processor-based communication device that comprises a camera (such as a cellphone or personal digital assistant), although the system may also be activated on any processor-based communication device—even without a camera. In an exemplary embodiment of the claimed invention, the system 1000 can store one or more individual profiles inputted by the user that specify various characteristics, such as but not limited to complexion colors (hair color, skin color, eye color and the like), bodily proportions (shoulder to hip ratio, size, weight and the like) and physical features (shape of face and neck and the like). The system 1000 can also store one or more apparel items inputted by the user. The user can input the information either by sending a digital picture of the person or item from which the system 1000 can extract characteristics or by entering data regarding the person or item. The system 1000 can store the individual profile and apparel items separately and may further link various apparel or accessory items to individual profiles. In another embodiment of the claimed invention, pictures can be taken on-the-go by a network enabled device 1200 comprising a digital camera 1210 which then transmits the picture to the inventive system.

Generally in one exemplary embodiment of the claimed invention, the inventive system and method will consider and evaluate this data by consulting database matrices that comprise the data in light of a set of rules, to perform calculations that generate scores associates with the items being analyzed. The system 1000 then uses these scores to compare and coordinate aspects of the apparel with those of an individual profile or of other apparel based on various factors including but not limited to color systems, ranges, harmonics, body color, proportion charts, and the like. The system 1000 essentially sorts, organizes, and evaluates the appropriateness of the coordination of the apparel or accessories based on the generated scores which indicate, on a sliding scale, an excellent to a less desirable selection. As mentioned above, the evaluated coordination can be for a variety of elements, including but not limited to the appropriateness of a preselected piece of apparel (such as a tie and shirt with each other), as well as the appropriateness of pieces of apparel with a particular individual that takes into consideration the specific dimensions of the particular individual. The system 1000 then can propose recommendations by applying the rules that coordinate characteristics of the apparel, such as but not limited to colors, textures, patterns, and proportions, to the individual profile information or other apparel information.

With reference to the Figures, further exemplary embodiments of the claimed invention are now described in greater detail. Although the description includes exemplary embodiments of the claimed invention, it can be easily seen that other embodiments are possible, and changes can be made to the embodiments described without departing from the spirit of the disclosed system and method.

The claimed system and method can be implemented using software, hardware, or a combination of hardware and software. Particularly, the inventive system and methods can be implemented using processor-based network enabled devices 1200 within a network of multiple computers or processor-based servers in local area networks, wide area networks, wireless telecommunication networks, intranets or the Internet, and the like. The claimed inventive application can be implemented using either object-oriented programming languages, like the JAVA™ and C++ programming languages, or procedural programming languages such as the C programming language, or any other known type of computer language. JAVA is a registered trademark of Sun Microsystems, Inc. Preferably, the claimed system and method are implemented as an application for processor-based network enabled devices 1200 comprising cameras 1210, the application either downloaded on to the device 1200 or being accessible through the telecommunications network 1400 or Internet 1400 to multiple end user network enabled devices 1200, e.g. cell phones, smartphones, laptops, netbooks, tablet PC, mobile wireless devices, personal digital assistants (PDA), and any other network enabled devices. It will be understood, however, that the claimed system and method can be implemented as a web application, the application being accessible through the Internet by processor-based communication devices 1200, including but not limited to laptops, desktops, personal digital assistants, smart phones and the like.

Referring now to FIG. 1, there is shown a system configuration in which the claimed system and method can operate and a block diagram showing the major modules that support the claimed invention according to an exemplary embodiment of the claimed invention. In alternate embodiments of the claimed invention, however, various other types of electronic devices 1200 communicating in a network can also be used and various other modules can be included as would be well understood by those of skill in the art. In such an exemplary embodiment of the claimed invention, a user 1500 communicates through a network enabled communication device, such as but not limited to processor based network enabled device 1200 comprising a camera 1210, with a computer environment, which can include a processor-based server 1100 or multiple processor-based server computers 1100 in a client/server relationship on a communications network 1400 such as the Internet. In a typical client/server environment, server 1100 includes an application that communicates with a processor-based network enabled device 1200, which can be a hand-held or portable network enabled electronic device (such as a personal digital assistant, a mobile wireless phone or smart phone, or any other web-enabled electronic device as would be understood by those of skill in the art.

The system 1000 can be any type of electronic transmission medium, for example, including but not limited to the following networks: a telecommunications network, a wireless network, a virtual private network, a public internet, a private internet, a secure internet, a private network, a public network, a value-added network, an intranet, a wireless gateway, or the like. The term "virtual private network" refers to a secure and encrypted communications link between nodes on the system 1000, a Wide Area Network (WAN), Intranet, the communications network 1400 or any other network transmission methods. In addition, the connectivity to the communications network 1400 may be via, for example, by cellular transmission, Ethernet, Token Ring, Fiber Distributed Datalink Interface, Asynchronous Transfer Mode, Wireless Application Protocol, or any other form of network connectivity. A user device 1200 can connect to the system 1000 by use of a network interface card or device 1220 that resides in the processor-based network enabled device 1200. It further shall be noted that in an alternate embodiment, the inventive application can be downloaded and utilized directly on the local user device, such as but not limited to network enabled device 1200. Moreover, in accordance with an embodiment of the claimed invention, the computer-based methods for implementing the claimed invention are implemented using processor-executable instructions for directing operation of a device or devices under processor control, the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example or downloading and installation from an Internet location (e.g. Web server).

In an exemplary embodiment of the claimed invention, server 1100 comprises various management hardware or software components for managing the inventive application. It will be understood that these components may be hardware-based, software-based, or a combination of both. Although the term server is used, the components therein do not necessarily need to reside at a common location, neither do any of the parts of a particular component. Server 1100 can comprise a database 1300 which stores all necessary information for properly executing the processes of the claimed invention. Of course, it will be understood by those of skill in the art, that database 1300 may also be remotely connected to server 1100 via the network 1400, or alternatively that some databases 1300 are local with the server 1100 and others are remote. As would be well known to those of skill in the art, devices other than the hardware configurations described above can be used to communicate with server 1100. Furthermore, it is also within the spirit of the claimed invention for the application or portions thereof to reside entirely on the network enabled device 1200, running locally on the device 1200.

The server 1100 comprises various management hardware or software components for executing the application. In an exemplary embodiment of the claimed invention, these components include: a processing manager 1110, a profile manager 1120, an apparel manager 1130, and a coordinator 1140. Each manager will be described and then referred to in the operation of an embodiment of the claimed invention with respect to FIGS. 2A-2H.

In an exemplary embodiment of the claimed invention, the processing manager 1110 acts as an interface between the user 1500 and the inventive application on the server 1100 by routing data to and from the user and calling the various application managers based on input from the user 1500.

In an exemplary embodiment of the claimed invention, the profile manager 1120 is responsible for the generation and management of individual profiles. In accordance with an aspect of the claimed invention, the profile manager 1120 is a java class that handles the generation of a profile and accessibility of the profiles.

The profile manager 1120 presents various questions to the user 1500 to generate a profile through the network enabled device 1200 regarding the characteristics of a particular individual, including but not limited to: hair color, complexion, proportion sizes, and the like. The profile manager 1120 then receives this data from the user 1500 through the network enabled device 1200. The profile manager 1120 then generates the profile and stores the requisite information for each profile in the database 1300. In accordance with an exemplary embodiment of the claimed invention, the user 1500 can take a digital photo of herself or another individual using the camera 1210 and can then transmit the digital photo to the application on the server 1100 via the network enabled device 1200. The profile manager 150 then receives the digital photograph and can extract the requisite characteristic information from the photograph to create the profile using digital photo extraction algorithms. To verify the accuracy of the extracted information, the profile manager 1120 can provide verification questions to the user 1500 through the network enabled device 1200, such as multiple choice input questions.

If the user 1500 elects to associate or coordinate an item of apparel with a particular profile, the profile manager 1120 retrieves the associated profile from database 1300 and updates the profile with the information. For example, in an exemplary embodiment of the claimed invention, one of the profiles in the system 1000 is designated as the "Active Profile" by the profile manager 1120—that is, the Profile that is currently being accessed by the user 1500 on the network enabled device 1200. The profile manager 1120 can hold the profiles in an indexed array and the profile manager 1120 can change the "Active Profile" designation in the array.

The apparel manager 1130 is responsible for the storing of apparel and accessory data and the management thereof. Specifically, in accordance with an exemplary embodiment of the claimed invention, the apparel manager 1130 is a java class that handles the storing of apparel items, analyzes characteristics of apparel items, the association of apparel and retrieves a piece of apparel for analysis.

A user 1500 can store apparel items to be used for coordination in the database 1300. These apparel items can be new apparel items or apparel items in an already existing wardrobe. In accordance with an exemplary embodiment of the claimed invention, the network enabled device 1200 can transmit user's digital photo of the apparel item to the server 1100 via network 1400. The apparel manager 1130 then receives the digital photograph and can store it in the database 1300 for use with either all or some of the profiles. In accordance with an aspect of the claimed invention, apparel manager 1130 can communicate with the profile manager 1120 to associate the apparel item with a particular profile or profiles, i.e. as part of a virtual "wardrobe" belonging to a profiled individual. The apparel manager 1130 can further extract characteristics of the apparel item such as but not limited to its color, pattern, and dimensions, by using digital extraction algorithms, and store that information in the database 1300 for use by the coordinator manager 1140. To verify the accuracy of the extracted information, the apparel manager 1130 can provide verification questions to the user 1500 through the network enabled device 1200, such as multiple choice questions. Alternatively, the apparel manager 1130 can save apparel item characteristics without a photograph by presenting various questions through the network enabled device 1200 regarding the characteristics of the particular apparel item. The apparel manager 1130 then receives this data from the user 1500 through the network enabled device 1200. The apparel manager 1130 then stores the apparel item in the database 1300.

In accordance with an exemplary embodiment of the claimed invention, the apparel manager 1130 parses the image colors (by pixel) of the image (i.e., the digital photo of the apparel item) to find the most widely used colors in the image. Although the apparel manager 1130 is shown to reside in the server 1100 in FIG. 1, the apparel manager 1130 can easily reside in the processor-based network enabled device 1200. The apparel manager 1130 converts the RGB (red, green blue) color matches into LAB color space, a color-opponent space with dimension L for lightness, "a" and "b" for the color-opponent dimensions. The apparel manager 1130 compares the LAB colors to the colors in the palette of the imaged garment, and then selects the most closely related colors from the image as compared to the garment color palette.

In accordance with an exemplary embodiment of the claimed invention, once the data of the apparel has been either inputted by the user 1500 or extracted from a digital photograph, the apparel manger 1130 can analyze and store particular characteristics of that piece of apparel. For example, such characteristics can include but are not limited to, its size, patterns, color, and the like.

In accordance with an exemplary embodiment of the claimed invention, should the user 1500 elect to associate or coordinate an item of apparel with a particular profile, the apparel manager 1130 sends a request to the profile manager 1120 and passes the requisite data to the profile manager 1130 for the association.

In accordance with an exemplary embodiment of the claimed invention, the apparel manager 1130 receives a request from the user 1500 through the network enabled device 1200 to retrieve a particular piece of apparel for analysis. The apparel manager 1130 retrieves the selected item from the database 1300 or extracts data from the digital photo of an item of apparel and passes on the requisite data associated therewith to the coordinator 1140.

In accordance with an exemplary embodiment of the claimed invention, the coordination or quality score can range from 0 to 10 where 10 is the best score. The coordinator 1140 bestows a quality score for each rule applied. It is appreciated that the scoring by the coordinator 1140 can be all or nothing, gradual or weighted, penalizing at the extremes or giving bonuses, depending on how a specific rule is formulated and applied. For example, the coordinator 1140 can apply bonus rule for profile colors echoed in the clothing's color composition of base colors and accent colors. That is, in accordance with an exemplary embodiment of the claimed invention, the coordinator 1440 can award 5 points out of 10 possible bonus points if there is silver or light gray featured in the clothing for a person with black-gray hair, and additional 3 bonus points if there is an additional echo of the person's or wearer's blue eyes in a blue accent color of the tie. In accordance with an exemplary aspect of the claimed invention, each garment receives a quality score which can be an average or weighted sum of all rules applied to the garment. The weighted sum can be based on the importance of a rule.

In accordance with an exemplary embodiment of the claimed invention, the coordinator 1140 uses the data stored in the database 1300 to perform the coordination analysis. Specifically, coordinator 1140 receives a request from the user 1500 through the network enabled device 1200 to coordinate either: an item of apparel with a profile; an item of apparel with other apparel; or a combination of both. The coordinator 1140 then requests the requisite data from the database 1300 and applies a set of rules to provide a particular coordination score, as further described below with respect to an exemplary embodiment of a process of the claimed invention, shown in FIGS. 2A-2H.

In accordance with an exemplary embodiment of the claimed invention, the coordinator 1140 coordinates an item of apparel specified by the user 1500 through the network enabled device 1200 with a profile also specified by the user 1500. The coordinator 1140 receives the profile data from the profile manager 1120 or alternatively retrieves the profile data directly from the database 1300. The coordinator 1140 receives the apparel data from the apparel manager 1130 or alternatively retrieves the apparel data from the database 1300. It then begins applying a set of rules to perform the analysis as explained below.

In accordance with an exemplary embodiment of the claimed invention, the coordinator 1140 applies a set of rules to calculate the quality or coordination score for the particular coordination request. The coordination score can denote aesthetic quality of an individual apparel item (i.e., a garment) or an ensemble. These rules include but are not limited to predetermined rules, sets of knowledge data and fuzzy logic, dynamic rules, and the like that establish relationships between a set of matrices reference look-up tables (for characteristics including but not limited to colors, shade, tints, tones, patterns, and the like) and rules in order to provide recommendations for apparel, accessories, and profiles. In an exemplary embodiment of the claimed invention, the system 1000 scores various correspondences and relationships separately using a gradual scale from best to worst in order to properly evaluate the various elements of the system. Exemplary rules include but are not limited to the following, which are merely examples that can be adopted in whole, in part, or not at all:

a) Profile Contrast Rules: In accordance with an exemplary embodiment of the claimed invention, for a given color combination of hair, facial hair, skin, and eye colors, the coordinator 1140 categorizes the individual's type of complexion as one of four types of personal contrast in descending order: high contrast, medium contrast, light-bright, and muted (tonal) based on the profile contrast rules.

b) Profile Proportions Rules: In accordance with an exemplary embodiment of the claimed invention, the coordinator 1140 considers the specific dimensions including but not limited to: relation or shoulder width to hip width; shoulder slope; weight; face shape; neck length and the like. Exemplary profile proportion rules include but are not limited to the following which are merely examples that can be adopted in whole, in part, or alternatively:
  1) The bulkier or wider the dimensions, the wider the proportions for relevant aspects of specific types of apparel (e.g. tie width of tie) is preferred. Conversely, the leaner or narrower the dimensions, the slimmer or smaller proportions for relevant aspects of specific types of apparel is preferred.
  2) The bulkier or wider the profile dimensions, the wider the tie is recommended.
  3) For a taller person, a longer tie is recommended.
  4) The bulkier or wider the profile dimensions of the profile, the wider the jacket lapel is recommended.
  5) The longer the neck in the profile, the higher the shirt collar is recommended.
  6) The wider the face in the profile, a longer shirt collar point is recommended.
  7) The wider the face, a narrower shirt collar spread is recommended.

c) Apparel Color Rules: The coordinator 1140 can employ the exemplary apparel color rules including but not limited to the following which are merely examples that can be adopted in whole, in part, or alternatively:
  1) The set of all possible colors is divided into four subsets (that may overlap) of colors that coordinate best with each of the four profile contrast types.
  2) The more colors of one or more apparel items belonging to the same subset as the corresponding recommended profile contrast type, the higher the color score. Conversely, the less colors of one or more apparel items belonging to the same subset as the corresponding recommended profile contrast type, the lower the color score.
  3) Points will be allotted if one or more of the colors of the personal contrast profile are also featured in the colors of the apparel item or items under consideration. Conversely, if none of the personal color profile is featured the score will be neutral, but not negative.
  4) The set of all possible colors is divided into several subsets (that may overlap) of colors that coordinate best with each other (harmonics such as color complementarities, etc.). Each type of harmonics corresponds to one or several or all of the four profile contrast types.
  5) If all the colors present in each apparel item belong to at least one of the harmonics types coordinating best with the profile contrast type applied, the score for color coordination is highest. The less colors belonging to the intersection of profile contrast type colors and recommended harmonic colors, the lower the color coordination score.
  6) If all the colors present in all apparel items belong to at least one of the harmonics types coordinating best with the profile contrast type applied, the score for color coordination is highest. The less colors belong to the intersection of profile contrast type colors and recommended harmonics colors, the lower the color coordination score.

d) Apparel Pattern Rules. In accordance with an exemplary embodiment of the claimed invention, the coordinator 1140 groups the patterns in a limited variety of twenty different types and considers the patterns purely as pattern and not as color or shade. Exemplary apparel pattern rules include but are not limited to the following which are merely examples that can be adopted in whole, in part, or alternatively:
  1) The bulkier or wider the personal profile dimensions, very fine or tiny patterns are not recommended. Conversely, the leaner or smaller the profile dimensions, very large patterns are not recommended. Otherwise, the presence of a single pattern is not further evaluated.
  2) In the presence of two patterns in an outfit, if the two patterns are of a different type (e.g. stripes and dots), a minimal difference in scale between the two patterns scores best.
  3) In the presence of two patterns in an outfit, if the two patterns are of the same type, a maximal difference in scale is best (e.g. fine stripes and very broad stripes).
  4) In the presence of three patterns in an outfit, if the three patterns are of a different type (e.g. stripes and dots and flower print), a careful difference in scale among the three patterns scores best.)
  5) In the presence of three patterns in an outfit, if two out of the three patterns are of the same type, a significant difference in scale is scored best for the same pair (e.g. fine stripes and very broad stripes). The third pattern has to be significantly different from the other patterns, yet resemble or echo both of the in terms of color or shape.
  6) In the presence of three patterns in an outfit, if the three patterns are of the same type (e.g. stripes), a maximal difference in scale among the three patterns scores best.
  7) The proper coordination of more than three patterns in an outfit is art. The system does not evaluate those combinations (or assigns a neutral given the degree of difficulty of getting that right).

In accordance with an exemplary embodiment of the claimed invention, should a coordination score be toward the low end, the coordinator 1140 can search through the database 1300 for apparel items that would be a better match. The coordinator 1140 can also include a bot, spider, or crawler program that will search the Internet or third-party database for images or descriptions that include apparel characteristics that would coordinate well with the profile, apparel, or combination thereof at issue. The coordinator 1140 can also search a third-party apparel database for apparel that would coordinate well with the profile, apparel, or combination thereof at issue.

In accordance with an exemplary embodiment of the claimed invention, the inventive system and related inventive processes accomplish at least the following: 1) creating a user profile; 2) storing a new apparel item; 2) coordinating new apparel with profile; 3) coordinating old apparel with profile; 3) coordinating new apparel with additional new apparel and profile; 4) coordinating new apparel with old apparel and profile; 5) coordinating old apparel with old apparel and profile; 5) coordinating new apparel with new apparel; 6) coordinating new apparel with old apparel; and 7) coordinating old apparel with old apparel.

In accordance with an exemplary embodiment of the claimed invention, the coordinator 1140 applies a set of rules to calculate a skill score which denotes a degree of difficulty or skill required to compose an outfit (i.e., an ensemble). The skill score is an absolute number which can vary by the number of rules applied and how well the user (e.g., the proposed ensemble coordinator) has conform to those rules. In contrast to the coordination score, the skill score is a sum (and not an average) of scores of all individual rules applied to a particular ensemble. Typically, an outfit with lots of patterns pose a greater challenge to the wearer. Consequently, the coordinator 1140 applies more set of rules, specifically more complex set of rules, which can challenge the knowledge and skill of the wearer or the ensemble coordinator. Unless the wearer has certain apparel expertise, it is hard to correctly match or coordinate three (3) or more stripe patterns in a single outfit. To coordinate three stripe patterns, the outfit should comprise garments having stripes of different scale. It should be appreciated that this does not mean that the wearer of an outfit comprising nearly solid color garments will look aesthetically worse than the wearer of a four (4) pattern outfit. It just means that less skill is required to coordinate solid color outfit than a pattern outfit. That is, two perfectly composed or coordinated outfits (one all solids and the other all patterns) can both obtain a coordination score of 10, but the all pattern outfit will receive a higher skill score than the all solid outfit. This enables the users 1500 of the system 1000 to educate themselves with regard to better dressing style, better ensemble selection and coordination. Additionally, users 1500 can use the skill scores to compare their ensemble coordination skills with each other.

An exemplary embodiment of the inventive system and related inventive processes are now described with respect to FIGS. 2A-2H. As exemplary shown in step 1 of FIG. 2A, the inventive system 1000 can be used by the user to generate and store an individual profile. Specifically, the network enabled device 1200 transmits a user request to the server 1100 through the network 1400 to generate a profile. The processing manager 1110 routes the request to profile manager 1120 which presents multiple-choice inquiries on the network enabled device 1200 regarding the profile characteristics. For example the network enabled device 1200 can present the following multiple choice queries to the user: hair color; skin color; eye color; weight; shoulder/hip ratio: equal; shoulder slope: average; face shape: average; neck shape: long. Of course other parameters can be presented as well. In response to the inquiry the network enabled device 1200 may receive and transmit the following exemplary responses from the user to the processing manager 1110 of the server 1100 over the network 1400: 1) hair color: dark blond; 2) skin color: fair and ruddy; 3) eye color: blue; 4) weight: 210 lb; height: 6'2"; 5) shoulder/hip ratio: equal; 6) shoulder slope: average; 7) face shape: average; 8) neck shape: long. The information received by the processing manager 1110 is routed to the profile manager 1120. The profile manager 1120 then generates the profile and stores it in database 1300.

Figure 2A:
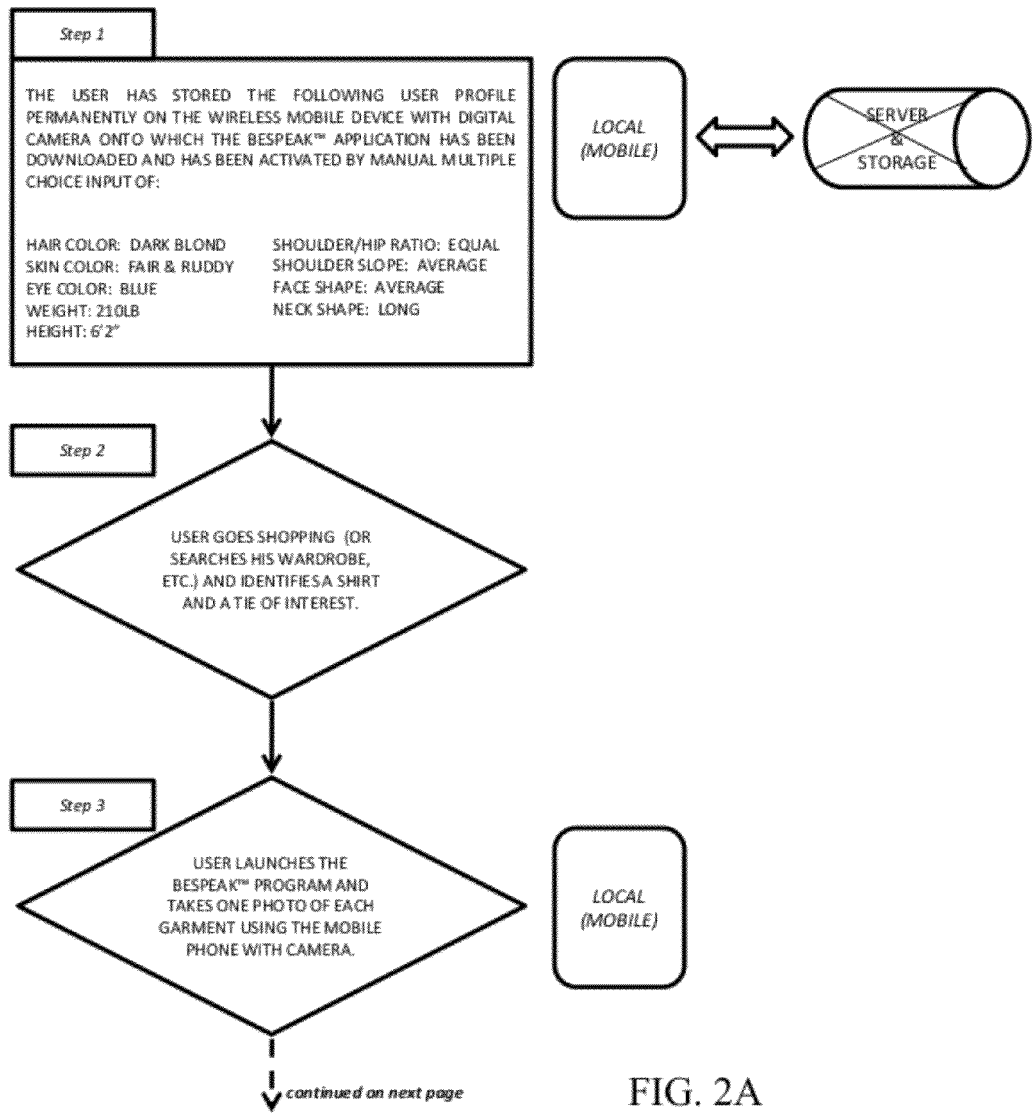
FIGS. 2A-2H are flow charts illustrating an exemplary process for coordinating in accordance with an exemplary embodiment of the claimed invention.

In steps 2 and 3 of FIG. 2A, for example, when the user 1500 identifies a shirt and tie of interest, the user 1500 launches the application through the network enabled device 1200 and the network enabled device 1200 offers one or more user interfaces for enabling the user to enter information and/or a photograph of an apparel item of interest. The processing manager 1110 of the server 1100 receives the request (the information and/or photograph of the apparel item of interest) from the network enabled device 1200 and routes it to the apparel manager 1130 for processing. Preferably, the request includes photographs of each apparel item, i.e. a shirt and a tie of interest which is transmitted to the server 1100. The apparel manger 1130 then stores the information and/or a photograph(s) in the database 1300.

Figure 2B:
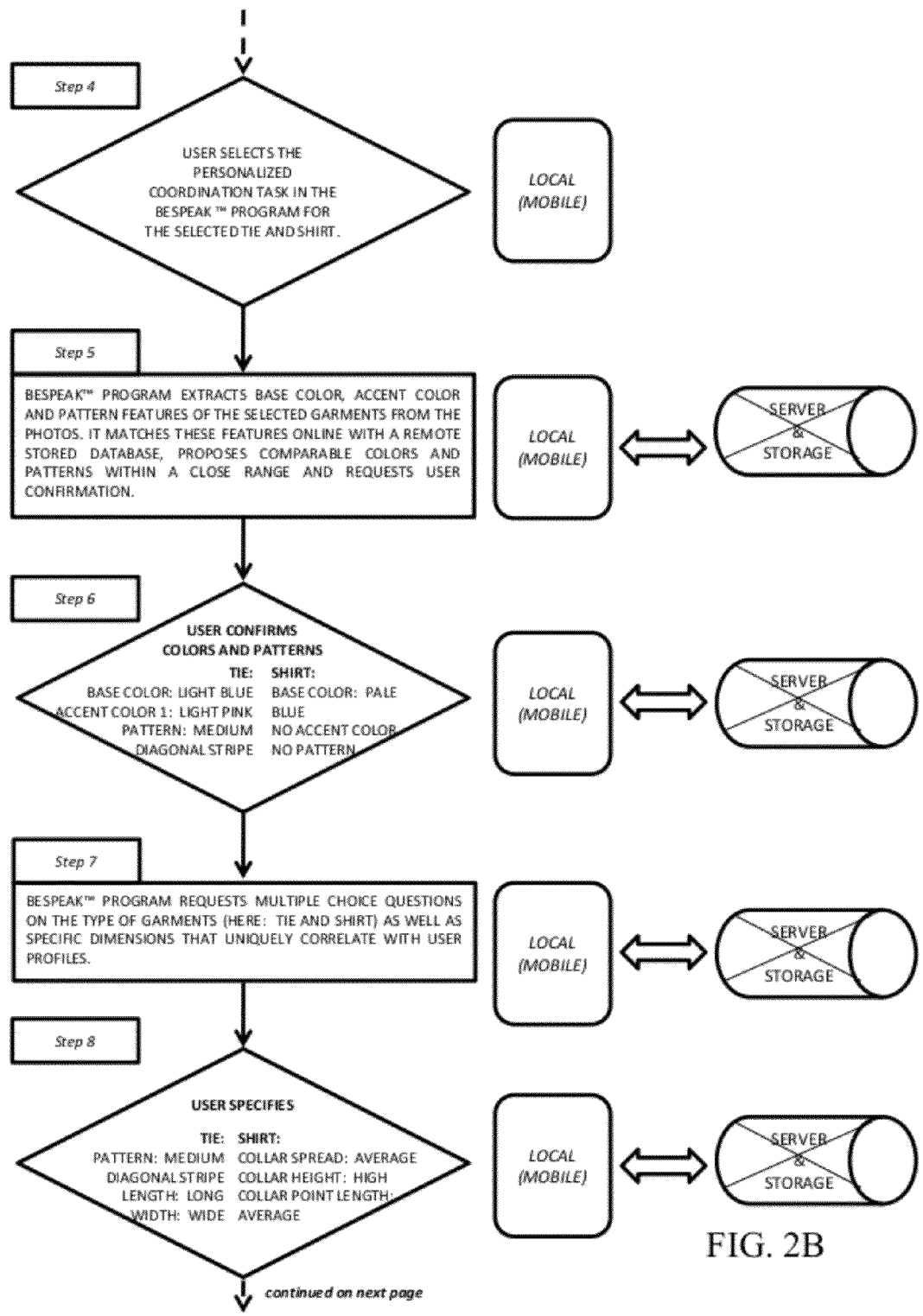

In step 4 of FIG. 2B, the processing manager 1110 receives a request from the network enabled device 1200 to coordinate the tie and shirt in light of the profile. In step 5 of FIG. 2B, the apparel manager 1130 receives the request and extracts characteristics of the tie and the shirt including their base color, accent colors, and pattern features, using digital extraction algorithms. Of course, in an alternate embodiment of the claimed invention this data can be entered by the user as well, rather than extracted. The apparel manager 1130 then provides multiple choice questions regarding the extracted information to the network enabled device 1200 for the user to confirm. In step 6 of FIG. 2B, the network enabled device 1200 transmits the user's responses to the confirmation requests regarding the extracted information. In step 7 of FIG. 2B, the apparel manager 1130 gathers additional information regarding the apparel items on the type of garment and the specific dimensions of the garment, by transmitting additional multiple choice questions to the network enabled device 1200 through the network 1400. In step 8 of FIG. 2B, the network enabled device 1200 transmits the user responses to the processing manager 1110 over the network 1400 which routes the data to the apparel manager 1130 for processing.

Figure 2C:
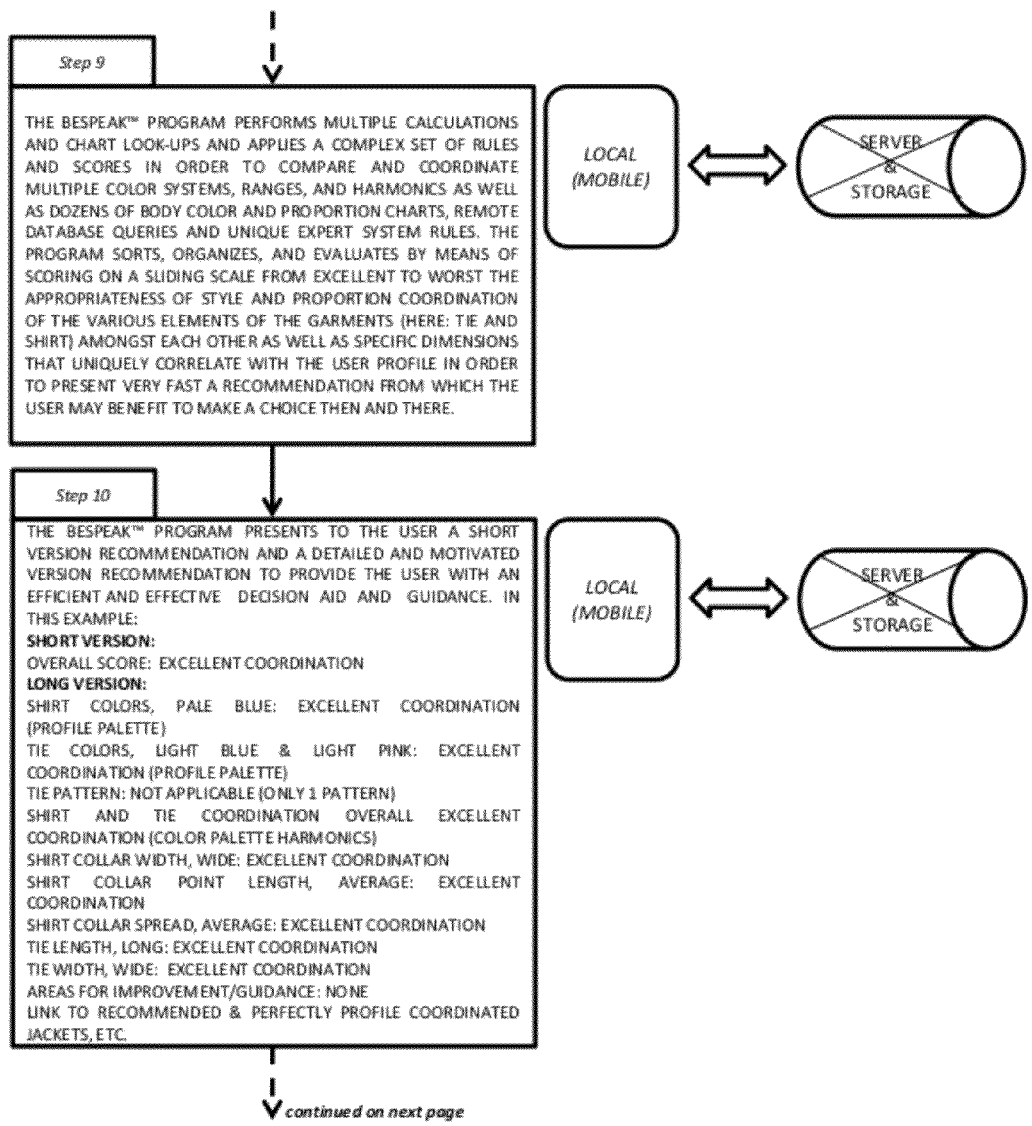

In step 9 of FIG. 2C, the apparel manager 1130 requests coordination of the data of the two apparel items from the coordinator 1140. The coordinator 1140 then performs multiple calculations and analyzes the data based on the data rules stored in database 1300 to score the coordination. In accordance with an exemplary embodiment of the claimed invention, the coordinator 1140 can utilize the exemplary high-level logic tables provided in FIGS. 3A-3E to analyze the data to calculate the score. In step 10 of FIG. 2C, the coordinator 1140 transmits to the network enabled device 1200 associated with the user 1500 a short summary of the recommendation and a detailed version thereof with the coordination score. In step 11 of FIG. 2D, the network enabled device 1200 transmits a request to store the apparel item in the user's digital wardrobe in the database 1300, if the user acquires or purchases the apparel item(s) of interest. In step 12 of FIG. 2D, the database 1300 stores the data such that it is associated with the user 1500. Specifically, the processing manager 1130 receives the request and routes it to the apparel manager 1130.

The apparel manager 1130 then stores the apparel data in the database 1300. The apparel manager 1130 stores the user's wardrobe on remote servers 1100 and can apply the same unique guidance and recommendations on all stored items in order to optimize the recommended use of the existing wardrobe as well as suggesting automatically or upon request new apparel items or accessories that ideally compliment the wardrobe and the user profile.

Figure 2D:
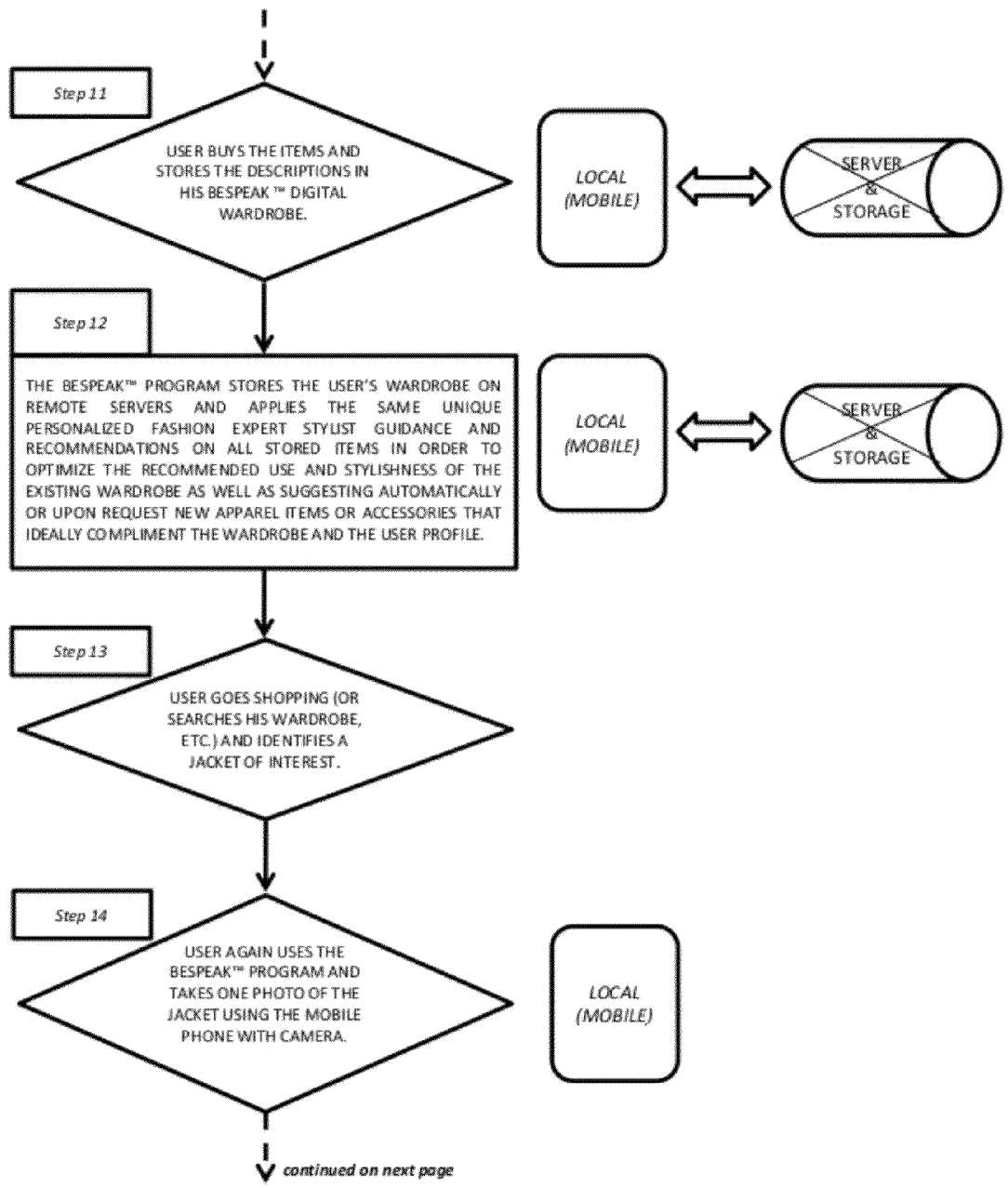

In steps 13 and 14 of FIG. 2D, when the user 1500 goes shopping (or searches his wardrobe) and identifies a jacket of interest, the user 1500 can launch the application through the network enabled device 1200 and the network enabled device 1200 offers one or more user interfaces for enabling the user to enter information and/or a photograph of an apparel item of interest. The processing manager 1110 receives the request (the information and/or photograph of the apparel item of interest) from the network enabled device 1200 and routes it to the apparel manager 1130 for processing. Preferably, the request includes photographs of each apparel item, i.e. a shirt and a tie of interest which is transmitted to the server 1100. The apparel manger 1130 then stores the information and/or a photograph(s) in the database 1300.

Figure 2E:
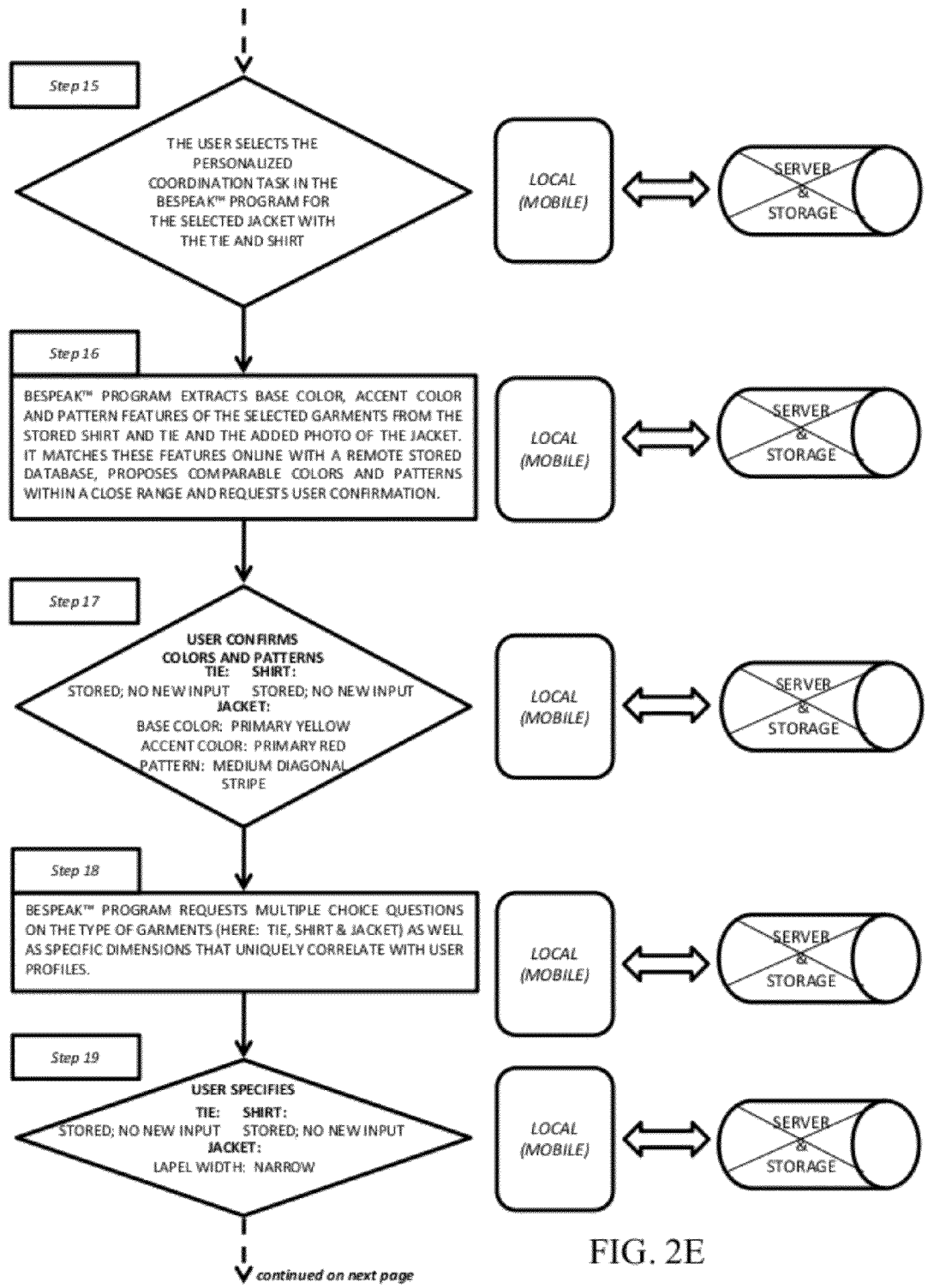

In step 15 of FIG. 2E, the processing manager 1110 receives a request from the network enabled device 1200 to coordinate the jacket with the already stored tie and shirt in light of the profile. In step 16 of FIG. 2E, the apparel manager 1130 receives the request and extracts characteristics of the jacket including their base color, accent colors, and pattern features, using digital extraction algorithms. Of course, in an alternate embodiment of the claimed invention this data can be entered by the user as well, rather than extracted. The apparel manager 1130 then provides multiple choice questions regarding the extracted information to the network enabled device 1200 for the user to confirm. In steps 16 and 17 of FIG. 2E, the network enabled device 1200 transmits the user's responses to the confirmation requests regarding the extracted information. In step 18 of FIG. 2E, the apparel manager 1130 gathers additional information regarding the apparel items on the type of garment and the specific dimensions of the garment, by transmitting additional multiple choice questions to the network enabled device 1200 through the network 1400. In step 19 of FIG. 2E, the network enabled device 1200 transmits the user responses to the processing manager 1110 over the network 1400 which routes the data to the apparel manager 1130 for processing.

Figure 2F:
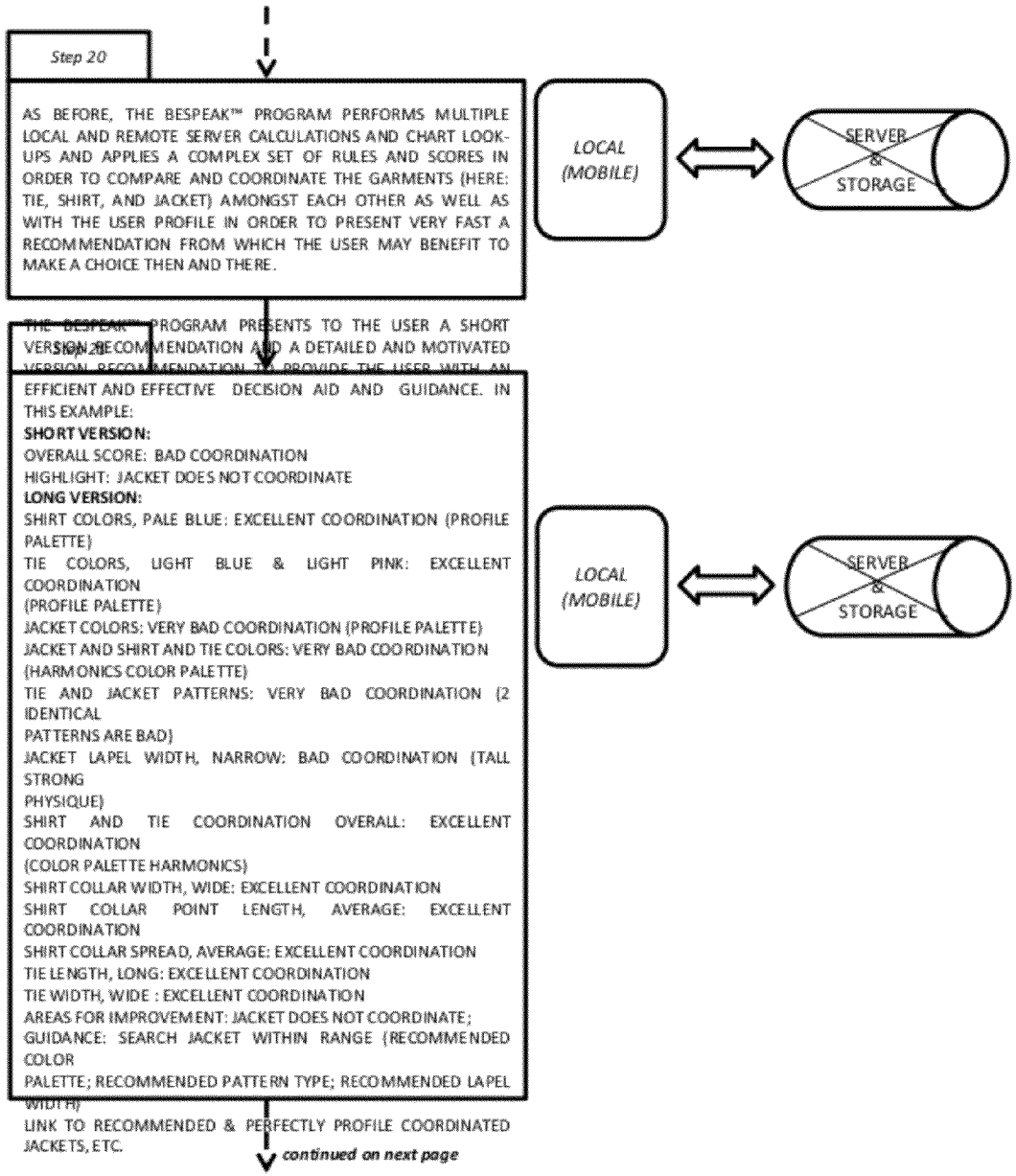

In step 20 of FIG. 2F, the apparel manager 1130 requests coordination of the data of the three apparel items in light of the profile from the coordinator 1140. The coordinator 1140 then performs multiple calculations and analyzes the data based on the data rules stored in the database 1300 to score the coordination. In accordance with an exemplary embodiment of the claimed invention, the coordinator 1140 can utilize the exemplary high-level logic tables provided in FIG. 3A-3E to analyze the data calculator the score. In step 21 of FIG. 2F, the coordinator 1140 transmits to the network enabled device 1200 associated with the user 1500 a short summary of the recommendation and a detailed version thereof with the coordination score.

Figure 2G:
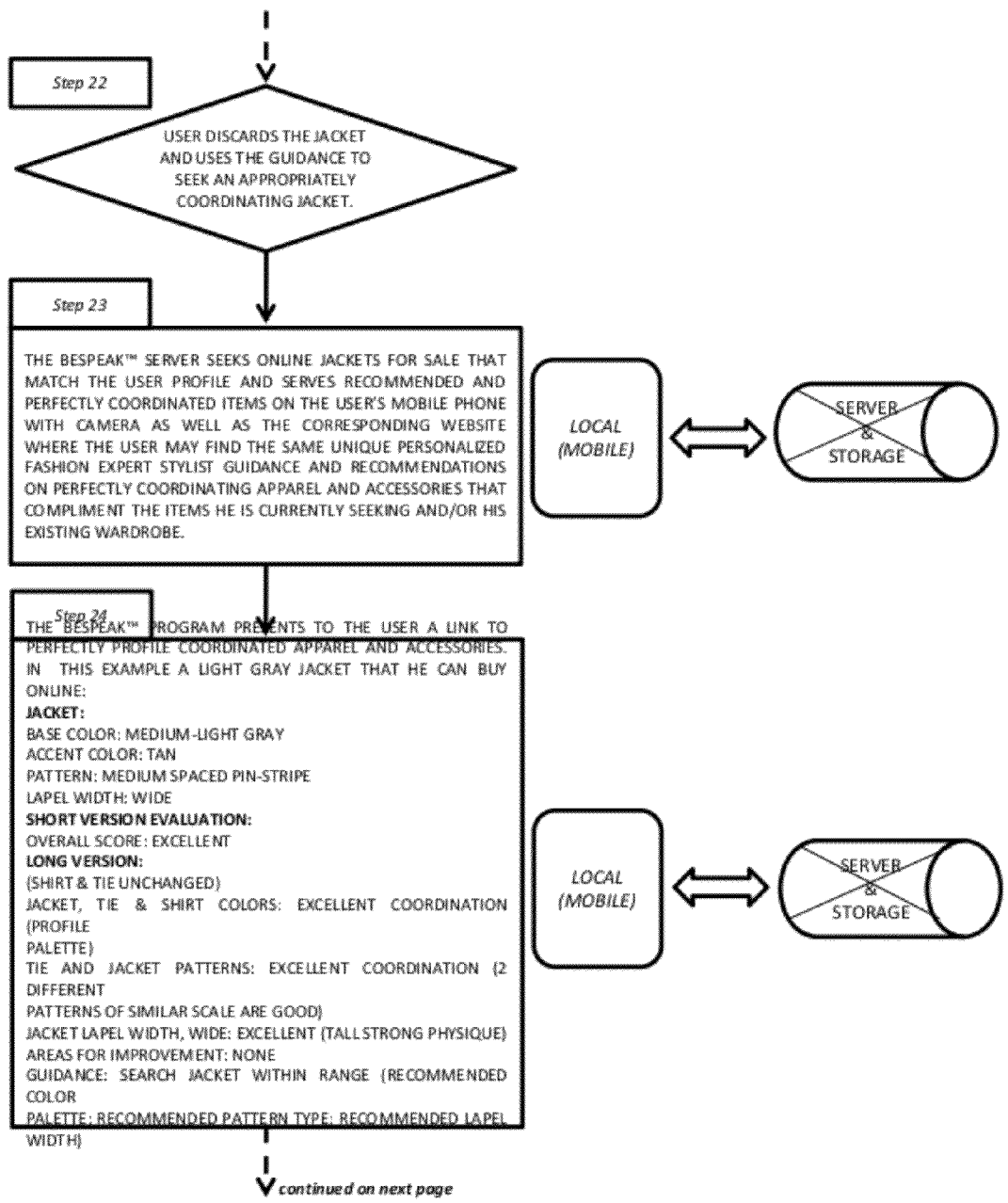
Figure 2H:
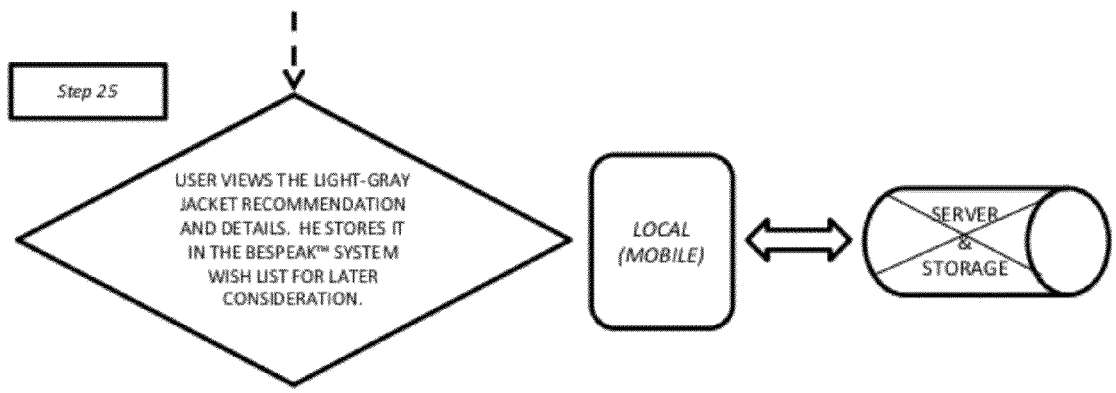

In step 22 of FIG. 2G, the user 1500 discards the jacket and uses the guidance to seek an appropriately coordinated jacket. The network enabled device 1200 then transmits a request to the processing manager 1110 over the network 1400 to search for a better coordinated jacket on the Internet. Thus, in step 23 of FIG. 2G, the server 1100 receives the request and the processing manager 1110 routes the request to the coordinator 1140. In step 23 of FIG. 2G, coordinator 1140 sends out several web crawlers to seek online jackets for sale that match the profile. The coordinator 1140 then presents the various items to the network enabled device 1200 for viewing by the user 1500 or on a corresponding Internet webpage or website where the inventive system can be accessed and utilized. In accordance with an exemplary embodiment of the claimed invention, the coordinator 1140 can seek apparel from predetermined third-party databases as well. In step 24 of FIG. 2G, the coordinator 1140 presents to the network enabled device 1200 a link or links to the suggested apparel, in this example, a light gray jacket that can be bought online. In step 25 of FIG. 2H, the network enabled device 1200 transmits a request to open a link to the recommended jacket and details to the processing manager 1110 which routes the request to the coordinator 1140. The network enabled device 1200 transmits a request to the coordinator 1140 to store the link and the photograph of the suggested item in the database 1300. The coordinator 1140 receives the request and stores the data in the database 1300.

It is noted that FIGS. 3A-3E show exemplary high-level logical steps or processes for Profile 1 performed by the apparel manager 1130 and the coordinator 1140 in accordance with an exemplary embodiment of the claimed invention. These exemplary logical steps can be modified or adopted in whole or in part, or not at all in alternate embodiments that would fall within the scope of the claimed invention.

Coordination Assessment of Profile and Two Apparel Items: Selected Shirt and Tie. Table 200 in FIG. 3A sets forth the exemplary data from the Profile M2 for the coordinator 1140 to analyze and table 250 sets forth the exemplary tie specifications for the coordinator 1140 to analyze. Table 300 in FIG. 3B shows the shirt specification for the coordinator 1140 to analyze. Blocks 410-450 in FIG. 3B show the exemplary logic performed by the coordinator 1140 to accomplish scoring two apparel items for profile M1 an exemplary. Specifically, in block 410, the coordinator 1140 scores the color of the tie in light of the exemplary profile M1 and generates a total average score. In block 420, the coordinator 1140 scores the color of the shirt parameters in light of the exemplary profile M1. In block 430 the coordinator 1140 scores the special parameters of the tie (such as the dimensions) in light of the exemplary profile M1. In block 440 of FIG. 3C, the coordinator 1140 scores the special parameters of the shirt in light of the exemplary profile. In block 450 of FIG. 3C, the coordinator 1140 scores the pattern of the tie in light of the exemplary profile and the pattern of the shirt and tie in light of the pattern of the shirt and tie. In block 460 of FIG. 3C, the coordinator 1140 scores the color of the tie and shirt against each other. In block 470 of FIG. 3C, the coordinator 1140 generates an overall total average score of the two items and exemplary profile M1 which in this exemplary embodiment of the claimed invention is the sum of all scores divided by the number of scores. Of course, it will be understood by those of skill in the art that the scoring parameters and methods can be altered to fit the desired goals and these alternate processes would still fall within the scope of the claimed invention.

Coordination Assessment of Profile and Three Apparel Items: Selected Shirt, Tie, and Jacket. Table 475 in FIG. 3D sets forth the exemplary jacket specifications for the coordinator 1140 to analyze, that were entered by the user 1500 via multiple choice input through the network enabled device 1200. Blocks 476-600 in FIGS. 3D-3E show the exemplary logic performed by the coordinator 1140 to accomplish scoring three apparel items in light of the exemplary profile M1 according to an exemplary embodiment of the claimed invention. Specifically, in block 476 of FIG. 3D, the coordinator 1140 scores the color of the jacket and in light of the exemplary profile M1 and generates a score. In block 480 of FIG. 3D, the coordinator 1140 scores the pattern parameters of the jacket against the tie. In block 490 of FIG. 3E, the coordinator 1140 scores the tie and jacket colors against each other. In block 495 of FIG. 3E, the coordinator 1140 scores the shirt and jacket colors against each other. In block 500 of FIG. 3E, the coordinator 1140 scores the special parameters (such as the dimensions) of the jacket in light of the exemplary profile M1. In block 510 of FIG. 3E, the coordinator 1140 generates an overall total average score of the three exemplary apparel items and exemplary profile M1 which in this exemplary embodiment of the claimed invention, is the sum of all scores divided by the number of scores. Of course, it will be understood by those of skill in the art that the scoring parameters and methods can be altered to fit the desired goals and these processes would still fall within the scope of the claimed invention.

The various embodiments of the claimed invention described herein have many advantages, including but not limited to a much more convenient way of coordinating and evaluating attire and accessories. In accordance with an exemplary embodiment of the claimed invention, a user 1500 inputs for permanent storage his or her personal physical profile into the inventive system operating on a network enabled device 1200 with a digital camera 1210. This personal profile can include but is not limited to colors (hair, skin, eyes, etc.) and proportions (face, shape, neck shape, shoulder to waist ratio, etc.) In accordance with an exemplary embodiment of the claimed invention, when one finds an apparel item of interest which shopping or surface the Internet, she can start the inventive application and take or obtain a photograph of the apparel item of interest (example: a light blue tie with overall grey elephant pattern). The claimed invention readily extracts from the digital photograph information on color(s) and/or pattern(s) and/or shape(s) using existing image recognition software algorithms as available and/or needed and applies a system of rules for the coordination analysis (e.g., mix and matching apparel items).

As described herein, in accordance with an exemplary embodiment of the claimed invention, the system 1000 applies its rules of color and/or proportion coordinating to items of apparel to the stored user profile (example: if user hair dark blond, and if user skin fair, and if user eyes blue, then: no high contrast colors, and then: coordinates blue). Thus, the inventive system 1000 readily offers a recommendation regarding the degree to which the apparel item coordinates (example: thus the recommendation will be positive for the light blue tie coordinating the fair complexion of the skin and light hair color as well as the blue eyes of the profile). In an alternate embodiment of the claimed invention, the system 1000 offers on the spot a weighted recommendation (Example; one to five scale of best to worst) to buy or not to buy or to consider or not to consider the apparel item of interest. In an exemplary embodiment of the claimed invention, the system 1000 can present the user with some explanation on how well the apparel item of interest coordinates with the profiles (Example: thus the recommendation will be positive for the light blue tie coordinating the fair complexion of the skin and light hair color as well as the blue eyes of the profile), or does not do so. The system 1000 can direct the user on where to buy an item that coordinates or similar items to the selected apparel item. Preferably, the user may store the photograph of the item of interest for further use.

Although the claimed invention has been described in considerable detail with reference to certain versions thereof, other versions are possible. For example: the inventive system can also: be applied to multiple profiles stored on the same network enabled device with a camera; be configured to coordinate several items of apparel with each other and a selected profile; be configured to store photographs of various apparel items in order to be ready to use for coordination on another occasion; be configured to select a coordinating apparel item or outfit in any circumstances (Example: select a coordinating outfit from an existing wardrobe at home) or wishing to select an apparel item for any reason or occasion; be configured to provide general guidance before shopping; be configured to coordinate apparel items in the absence of a user profile; be configured to generate and automatic wardrobe; be configured to arrange for gifts based on a profile or inputted individual characteristics. It is possible to disable the profile coordination functionality and simply coordinate apparel items with each other to create for example an ensemble as a gift for a recipient whose exact profile is not known. For example, a person may want to select and offer a clothing item or clothing accessory item as a gift to another party. Further, the system can allow for permanent or temporary storage of multiple personal profiles to assist and guide for gift-giving or other occasions such as several people (e.g. mother and daughter) using one mobile device. In accordance with the embodiments of the claimed invention, the system 1000 can consider dimensions unique to children or women; the system could take into account characteristics such as but not limited to make-up, changing hair color, favorite hues, and the like. Any and all such versions and others as readily understood by those of skill in the art are contemplated by the claimed invention.

The invention claimed is:

1. A computer implemented method for coordinating and evaluating apparel items, comprising the steps of:

receiving a digital image of an apparel item by a processor based client device for coordination with a stored apparel item selected from user's virtual wardrobe by a user, the user's virtual wardrobe being stored in a storage device;

extracting colors, pattern, texture, length and width features of said apparel item received for coordination from the digital image of said apparel item by the processor based client device;

categorizing user's contrast type by the processor based client device based on a profile contrast rule and a combination of user's hair color, facial hair color, skin color, skin tone, facial complexion, and eye color;

categorizing user's body type by the processor based client device based on the profile contrast rule and user's neck shape, neck length, shoulder slope and face shape;

categorizing user's relative body proportions by the processor based client device based at least one of the following: shoulder to waist ratio or shoulder to hip ratio;

storing extracted colors and extracted pattern features of said apparel item received for coordination, user's contrast type, user's body type and user's relative body proportion in the user's virtual wardrobe by the processor based client device;

calculating a coordination score of said apparel item based on the color and pattern features extracted from the digital image of said apparel item by the processor based client device to determine whether said apparel item compliments physical characteristics and relative bodily proportions/dimensions of said user and coordinates with the stored apparel item, the processor based client device:

calculates a first color score by comparing the extracted colors of said apparel item received for coordination to base and accent colors of user's contrast type to determine an amount of the base and accent colors appearing in said apparel item received for coordination;

calculates a second color score by comparing the extracted colors of two apparel items received and selected for coordination to determine matching colors;

determines and stores a pattern type and size of the pattern from the extracted pattern features of said apparel item received for coordination in the user's virtual wardrobe;

calculates a first pattern score by comparing the pattern type and the size of the pattern of said apparel item received for coordination to user's relative body proportions;

calculates a second pattern score by comparing the pattern type and the size of the pattern of the two apparel items for coordination;

calculates the coordination score by summing the first color score, the second color score, the first pattern score and the second pattern score;

calculates a skill score by summing the second color score and the second pattern score, the skill score representing a difficulty level of coordinating two apparel items received and selected for coordination; and generating a sliding coordination score and a summary based on the coordination score;

providing a negative recommendation of said apparel item received for coordination if it is determined that said apparel item received for coordination does not compliment the physical characteristics and the relative bodily dimensions of said user based on the sliding coordination score;

providing the skill score and a positive recommendation of said apparel item received for coordination if it is determined that said apparel item received for coordination compliments the physical characteristics and the relative bodily dimensions of said user and coordinates with the stored apparel item selected for coordination based on the sliding coordination score; and providing the skill score and a recommendation of another apparel item from the user's virtual wardrobe if it is determined that said apparel item received for coordination compliments the physical characteristics and the relative bodily proportions/dimensions of said user but does not coordinate with the stored apparel item selected for coordination based on the sliding coordination score.

2. The method of claim 1, further comprising the steps of transmitting the physical characteristics and the relative bodily proportions/dimensions to a processor based server associated with a retailer's website over a communications network; and receiving information about one or more apparel items sold on the retailer's website that compliments the physical characteristics and the relative bodily proportions/dimensions of said user from the processor based server by the processor based client device associated with said user over said communications network.

3. The method of claim 1, further comprising the steps of receiving answers to a plurality of questions to generate a profile of said user, the profile comprising at least one of the following physical characteristics or relative bodily proportions/dimensions of said user: facial complexion, body proportions, skin color, skin tone, face shape, neck shape, neck length, height, weight, shoulder to waist ratio, shoulder to hip ratio, shoulder slope, hair color and eye color; and storing the profile and received answers to said plurality of questions in the storage device of the processor based client device.

4. The method of claim 1, wherein the user's virtual wardrobe comprises information relating to a plurality of apparel items of said user.

5. The method of claim 1, further comprising the steps of generating the user's virtual wardrobe by the processor based client device associated with said user based on information received relating to a plurality of apparel items of said user; and storing the user's virtual wardrobe in the storage device of said client device.

6. The method of claim 5, wherein the step of generating the user's virtual wardrobe comprises the step of receiving answers to a plurality of questions by the processor based client device associated with said user; and storing received answers to said plurality of questions in the storage device of processor based client device associated with said user.

7. The method of claim 1, further comprising the step of storing said apparel item in the user's virtual wardrobe if said apparel item received for coordination is acquired by said user.

8. The method of claim 1, further comprising the step of searching Internet or third-party database for an apparel item that compliments the physical characteristics and the relative bodily proportions/dimensions of said user and coordinates with said one or more apparel items in the user's virtual wardrobe by the processor based client device over said communications network.

9. The method of claim 1, further comprising the steps of:

calculating another person's coordination score of an apparel item received for coordination for the other person by the processor based client device to determine whether said apparel item for the other person compliments physical characteristics and relative bodily proportions/dimensions of the other person and coordinates with a stored apparel item selected from a virtual wardrobe of the other person by said user;

generating other person's sliding coordination score and summary based on the other person's coordination score;

providing a negative recommendation of said apparel item received for coordination for the other person if it is determined that said apparel item received for coordination for the other person does not compliment the physical characteristics and the relative bodily dimensions of the other person based on the other person's sliding coordination score;

providing a positive recommendation of said apparel item received for coordination for the other person if it is determined that said apparel item received for coordination for the other person compliments the physical characteristics and the relative bodily dimensions of the other person and coordinates with the stored apparel item of the other person selected for coordination by said user based on the other person's sliding coordination score; and providing a recommendation of another apparel item from the virtual wardrobe of the other person if it is determined that said apparel item received for coordination for the other person compliments the physical characteristics and the relative bodily proportions/dimensions of the other person but does not coordinate with the stored apparel item selected from the virtual wardrobe of the other person for coordination based on the other person's sliding coordination score.

10. The method of claim 1, further comprising the step of selecting said apparel item from a plurality of apparel items sold by a retailer.

11. The method of claim 1, further comprising the step of obtaining the digital image from a digital camera associated with the processor based client device.

12. A computer implemented method for coordinating and evaluating apparel items, comprising the steps of:
receiving a digital image of an apparel item for coordination with a stored apparel item selected from user's virtual wardrobe by a user from a processor based client device associated with the user by a processor based server over a communications network, the user's virtual wardrobe being stored in a database;
extracting colors, pattern, texture, length and width features of said apparel item received for coordination from the digital image of said apparel item by the server;
categorizing user's contrast type by the server based on a profile contrast rule and a combination of user's hair color, facial hair color, skin color, skin tone, facial complexion, and eye color;
categorizing user's body type by the server based on the profile contrast rule and user's neck shape, neck length, shoulder slope and face shape;
categorizing user's relative body proportions by the server based at least one of the following: shoulder to waist ratio or shoulder to hip ratio;
storing extracted colors and extracted pattern features of said apparel item received for coordination, user's contrast type, user's body type and user's relative body proportion in the user's virtual wardrobe by the server;
calculating a coordination score of said apparel item based on the color and pattern features extracted from the digital image of said apparel item by the server to determine whether said apparel item compliments physical characteristics and relative bodily proportions/dimensions of said user and coordinates with the stored apparel item, the server;
calculates a first color score by comparing the extracted colors of said apparel item received for coordination to base and accent colors of user's contrast type to determine an amount of the base and accent colors appearing in said apparel item received for coordination;
calculates a second color score by comparing the extracted colors of two apparel items received and selected for coordination to determine matching colors;
determines and stores a pattern type and size of the pattern from the extracted pattern features of said apparel item received for coordination in the user's virtual wardrobe;
calculates a first pattern score by comparing the pattern type and the size of the pattern of said apparel item received for coordination to user's relative body proportions;
calculates a second pattern score by comparing the pattern type and the size of the pattern of the two apparel items for coordination;
calculates the coordination score by summing the first color score, the second color score, the first pattern score and the second pattern score;
calculates a skill score by summing the second color score and the second pattern score, the skill score representing a difficulty level of coordinating two apparel items received and selected for coordination; and
generating a sliding coordination score and a summary based on the coordination score;
providing a negative recommendation of said apparel item received for coordination if it is determined that said apparel item received for coordination does not compliment the physical characteristics and the relative bodily dimensions of said user based on the sliding coordination score;
providing the skill score and a positive recommendation of said apparel item received for coordination if it is determined that said apparel item received for coordination compliments the physical characteristics and the relative bodily dimensions of said user and coordinates with the stored apparel item selected for coordination based on the sliding coordination score; and
providing the skill score and a recommendation of another apparel item from the user's virtual wardrobe if it is determined that said apparel item received for coordination compliments the physical characteristics and the relative bodily proportions/dimensions of said user but does not coordinate with the stored apparel item selected for coordination based on the sliding coordination score.

13. The method of claim 12, further comprising the step of receiving a digital image of said apparel item by the processor based server from a digital camera of the processor based client device over said communications network; and
extracting features of said apparel item from the digital image by said processor based server.

14. The method of claim 12, further comprising the steps of transmitting a plurality of questions to the processor based client device associated with said user to generate a profile of said user by the processor based server over said communications network, the profile comprising at least one of the following physical characteristics or relative bodily proportions/dimensions of said user: facial complexion, body proportions, skin color, skin tone, face shape, neck shape, neck length, height, weight, shoulder to waist ratio, shoulder to hip ratio, shoulder slope, hair color and eye color; and receiving answers entered on the processor based client device to said plurality of questions by the processor based server over said communications network; and storing the profile and received answers to said plurality of questions in a database.

15. The method of claim 12, further comprising the steps of generating the user's virtual wardrobe by the processor based server based on information received relating to a plurality of apparel items of said user from the processor based client device associated with said user over said communications network; and storing the user's virtual wardrobe in a database.

16. The method of claim 15, wherein the step of generating the user's virtual wardrobe comprises the step of transmitting a plurality of questions to the processor based client device by the processor based server over said communications network; and receiving answers entered on the processor based client device to said plurality of questions by the processor based server over said communications network; and storing received answers to said plurality of questions in the database.

17. The method of claim 12, further comprising the step of searching Internet or third-party database for an apparel item that compliments the physical characteristics and the relative bodily proportions/dimensions of said user and coordinates with said one or more apparel items in the user's virtual wardrobe by the processor based server over said communications network; and transmitting information relating to said apparel item from Internet or third-party database to the processor based client device associated with said user by the processor based server over said communications network.

18. The method of claim 12, wherein the processor based server is associated with a retailer's website; and transmitting information about one or more apparel items sold on the retailer's website that compliments the physical characteristics and the relative bodily proportions/dimensions of said user to the processor based client device by the server over said communications network.

19. The method of claim 12, further comprising the steps of:
calculating another person's coordination score of an apparel item received for coordination for the other person by the server to determine whether said apparel item for the other person compliments physical characteristics and relative bodily proportions/dimensions of the other person and coordinates with a stored apparel item selected from a virtual wardrobe of the other person by said user;
generating other person's sliding coordination score and summary based on the other person's coordination score;
providing a negative recommendation of said apparel item received for coordination for the other person if it is determined that said apparel item received for coordination for the other person does not compliment the physical characteristics and the relative bodily dimensions of the other person based on the other person's sliding coordination score;
providing a positive recommendation of said apparel item received for coordination for the other person if it is determined that said apparel item received for coordination for the other person compliments the physical characteristics and the relative bodily dimensions of the other person and coordinates with the stored apparel item of the other person selected for coordination by said user based on the other person's sliding coordination score; and
providing a recommendation of another apparel item from the virtual wardrobe of the other person if it is determined that said apparel item received for coordination for the other person compliments the physical characteristics and the relative bodily proportions/dimensions of the other person but does not coordinate with the stored apparel item selected from the virtual wardrobe of the other person for coordination based on the other person's sliding coordination score.

20. A non-transitory computer readable medium comprising computer executable code for coordinating and evaluating apparel items, said code comprising instructions for:
receiving a digital image of an apparel item by a processor based client device for coordination with a stored apparel item selected from user's virtual wardrobe by a user, the user's virtual wardrobe being stored in a storage device;
extracting colors, pattern, texture, length and width features of said apparel item received for coordination from the digital image of said apparel item by the processor based client device;
categorizing user's contrast type by the processor based client device based on a profile contrast rule and a combination of user's hair color, facial hair color, skin color, skin tone, facial complexion, and eye color;
categorizing user's body type by the processor based client device based on the profile contrast rule and user's neck shape, neck length, shoulder slope and face shape;
categorizing user's relative body proportions by the processor based client device based at least one of the following: shoulder to waist ratio or shoulder to hip ratio;
storing extracted colors and extracted pattern features of said apparel item received for coordination, user's contrast type, user's body type and user's relative body proportion in the user's virtual wardrobe by the processor based client device;
calculating a coordination score of said apparel item based on the color and pattern features extracted from the digital image of said apparel item by the processor based client device to determine whether said apparel item compliments physical characteristics and relative bodily proportions/dimensions of said user and coordinates with the stored apparel item, the processor based client device:
calculates a first color score by comparing the extracted colors of said apparel item received for coordination to base and accent colors of user's contrast type to determine an amount of the base and accent colors appearing in said apparel item received for coordination;
calculates a second color score by comparing the extracted colors of two apparel items received and selected for coordination to determine matching colors;
determines and stores a pattern type and size of the pattern from the extracted pattern features of said apparel item received for coordination in the user's virtual wardrobe;
calculates a first pattern score by comparing the pattern type and the size of the pattern of said apparel item received for coordination to user's relative body proportions;
calculates a second pattern score by comparing the pattern type and the size of the pattern of the two apparel items for coordination;
calculates the coordination score by summing the first color score, the second color score, the first pattern score and the second pattern score;
calculates a skill score by summing the second color score and the second pattern score, the skill score representing a difficulty level of coordinating two apparel items received and selected for coordination; and
generating a sliding coordination score and a summary based on the coordination score;
providing a negative recommendation of said apparel item received for coordination if it is determined that said apparel item received for coordination does not compliment the physical characteristics and the relative bodily dimensions of said user based on the sliding coordination score;
providing the skill score and a positive recommendation of said apparel item received for coordination if it is determined that said apparel item received for coordination compliments the physical characteristics and the relative bodily dimensions of said user and coordinates with the stored apparel item selected for coordination based on the sliding coordination score; and
providing the skill score and a recommendation of another apparel item from the user's virtual wardrobe if it is determined that said apparel item received for coordination compliments the physical characteristics and the relative bodily proportions/dimensions of said user but does not coordinate with the stored apparel item selected for coordination based on the sliding coordination score.

21. The computer readable medium of claim 20, further comprising instructions for transmitting the physical characteristics and the relative bodily proportions/dimensions to a processor based server associated with a retailer's website over a communications network; and receiving information about one or more apparel items sold on the retailer's website that compliments the physical characteristics and the relative bodily proportions/dimensions of said user from the processor based server by the processor based client device associated with said user over said communications network.

22. The computer readable medium of claim 20, further comprising the instructions for receiving answers to a plurality of questions to generate a profile of said user to coordinate and evaluate apparel items in the user's virtual wardrobe, the profile comprising at least one of the following physical characteristics or relative bodily proportions/dimensions of said user: facial complexion, body proportions, skin color, skin tone, face shape, neck shape, neck length, height, weight, shoulder to waist ratio, shoulder to hip ratio, shoulder slope, hair color and eye color; and storing the profile and received answers to said plurality of questions in the storage device of the processor based client device.

23. The computer readable medium of claim 20, wherein the user's virtual wardrobe comprises information relating to a plurality of apparel items of said user.

24. The computer readable medium of claim 20, further comprising instructions for transmitting over a communications network by the processor based client device the digital image of said apparel item to a processor based server for extracting features of said apparel item from the digital image.

25. The computer readable medium of claim 20, further comprising the instructions for receiving answers to a plurality of questions to generate a profile of another person to coordinate and evaluate apparel items in a virtual wardrobe associated with said other person, the profile comprising at least one of the following physical characteristics or relative bodily proportions/dimensions of said other person: facial complexion, body proportions, skin color, skin tone, face shape, neck shape, neck length, height, weight, shoulder to waist ratio, shoulder to hip ratio, shoulder slope, hair color and eye color; and storing said profile of said other person and received answers to the questions in the storage device of the processor based client device associated with the user.

26. The computer readable medium of claim 20, further comprising instructions for generating the user's virtual wardrobe by the processor based client device associated with said user based on information received relating to a plurality of apparel items of said user; and storing the user's virtual wardrobe in the storage device of said client device.

27. The computer readable medium of claim 26, further comprising instructions for receiving answers to a plurality of questions to generate the user's virtual wardrobe by the processor based client device; and storing received answers to said plurality of questions in the storage device of the processor client device.

28. The computer readable medium of claim 20, further comprising instructions for transmitting over a communications network by the processor based client device information relating to a plurality of apparel items of said user to a processor based server to generate and store the user's virtual wardrobe in a database, said virtual wardrobe comprising virtual wardrobe comprising information relating to a plurality of apparel/accessory items.

29. The computer readable medium of claim 20, further comprising instructions for storing said apparel item in the user's virtual wardrobe if said apparel item received for coordination is acquired by said user.

30. The computer readable medium of claim 20, further comprising instructions for searching Internet or third-party database for an apparel item that coordinates with said one or more apparel items in the user's virtual wardrobe by the processor based client device over a communications network.

31. The computer readable medium of claim 20, further comprising instructions for searching Internet or third-party database for an apparel item that compliments the physical characteristics and bodily proportions of said user by the processor based client device over a communications network.

32. The method of claim 20, further comprising instructions for:
calculating another person's coordination score of an apparel item received for coordination for the other person by the processor based client device to determine whether said apparel item for the other person compliments physical characteristics and relative bodily proportions/dimensions of the other person and coordinates with a stored apparel item selected from a virtual wardrobe of the other person by said user;
generating other person's sliding coordination score and summary based on the other person's coordination score;
providing a negative recommendation of said apparel item received for coordination for the other person if it is determined that said apparel item received for coordination for the other person does not compliment the physical characteristics and the relative bodily dimensions of the other person based on the other person's sliding coordination score;
providing a positive recommendation of said apparel item received for coordination for the other person if it is determined that said apparel item received for coordination for the other person compliments the physical characteristics and the relative bodily dimensions of the other person and coordinates with the stored apparel item of the other person selected for coordination by said user based on the other person's sliding coordination score; and
providing a recommendation of another apparel item from the virtual wardrobe of the other person if it is determined that said apparel item received for coordination for the other person compliments the physical characteristics and the relative bodily proportions/dimensions of the other person but does not coordinate with the stored apparel item selected from the virtual wardrobe of the other person for coordination based on the other person's sliding coordination score.

33. A system for coordinating and evaluating apparel items, comprising:
a processor based client device associated with a user for receiving a digital image of an apparel item for coordination;
a processor based server for:
receiving from said client device over a communications network the digital image of said apparel item for coordination with a stored apparel item selected from a user's virtual wardrobe by a user, the user's virtual wardrobe being stored in a database;
extracting colors, pattern, texture, length and width features of said apparel item received for coordination from the digital image of said apparel item received said client device;
categorizing user's contrast type by the processor based client device based on a profile contrast rule and a combination of user's hair color, facial hair color, skin color, skin tone, facial complexion, and eye color;

categorizing user's body type by the processor based client device based on the profile contrast rule and user's neck shape, neck length, shoulder slope and face shape;

categorizing user's relative body proportions by the processor based client device based at least one of the following: shoulder to waist ratio or shoulder to hip ratio;

storing extracted colors and extracted pattern features of said apparel item received for coordination, user's contrast type, user's body type and user's relative body proportion in the user's virtual wardrobe;

calculating a coordination score of said apparel item based on the color and pattern features extracted from the digital image of said apparel item to determine whether said apparel item compliments physical characteristics and relative bodily proportions/dimensions of said user and coordinates with the stored apparel item, the processor based server:

calculates a first color score by comparing the extracted colors of said apparel item received for coordination to base and accent colors of user's contrast type to determine an amount of the base and accent colors appearing in said apparel item received for coordination;

calculates a second color score by comparing the extracted colors of two apparel items received and selected for coordination to determine matching colors;

determines and stores a pattern type and size of the pattern from the extracted pattern features of said apparel item received for coordination in the user's virtual wardrobe;

calculates a first pattern score by comparing the pattern type and the size of the pattern of said apparel item received for coordination to user's relative body proportions;

calculates a second pattern score by comparing the pattern type and the size of the pattern of the two apparel items for coordination;

calculates the coordination score by summing the first color score, the second color score, the first pattern score and the second pattern score;

calculates a skill score by summing the second color score and the second pattern score, the skill score representing a difficulty level of coordinating two apparel items received and selected for coordination; and generating a sliding coordination score and a summary based on the coordination score;

providing a negative recommendation of said apparel item received for coordination if it is determined that said apparel item received for coordination does not compliment the physical characteristics and the relative bodily dimensions of said user based on the sliding coordination score;

providing the skill score and a positive recommendation of said apparel item received for coordination if it is determined that said apparel item received for coordination compliments the physical characteristics and the relative bodily dimensions of said user and coordinates with the stored apparel item selected for coordination based on the sliding coordination score; and providing the skill score and a recommendation of another apparel item from the user's virtual wardrobe if it is determined that said apparel item received for coordination compliments the physical characteristics and the relative bodily proportions/dimensions of said user but does not coordinate with the stored apparel item selected for coordination based on the sliding coordination score.

34. The system of claim 33, wherein said server transmits the recommendation of one or more apparel items from a retailer's website that coordinates with one or more apparel items in the user's virtual wardrobe to said client device over said communications network, the user's virtual wardrobe comprising information relating to a plurality of apparel items of said user.

35. The system of claim 33, wherein said server is associated with a retailer's website and transmits the recommendation of one or more apparel items from said retailer's website that compliment physical characteristics and relative bodily proportions/dimensions of said user to said client device over said communications network.

36. The system of claim of 33, wherein said server searches a retailer's website for one or more apparel items that compliment physical characteristics and relative bodily proportions/dimensions of said user and transmits information relating to said one or more apparel items to said client device over said communications network.

37. The system of claim 33, wherein said server transmits a plurality of questions to generate a profile of said user to coordinate and evaluate apparel items in the user's virtual wardrobe, the profile comprising at least one of the following physical characteristics or relative bodily proportions/dimensions of said user: facial complexion, body proportions, skin color, skin tone, face shape, neck shape, neck length, height, weight, shoulder to waist ratio, shoulder to hip ratio, shoulder slope, hair color and eye color to said client device over said communications network and receives answers entered on said client device by said user to said plurality of questions from said client device over said communications network; and further comprising the database for storing said profile and received answers to said plurality of questions.

38. The system of claim 33, wherein said server receives information about said apparel item entered on said client device by said user from said client device over a communications network; and wherein the database stores said entered information.

39. The system of claim 33, wherein said server receives the digital image of said apparel item from a digital camera of said client device over said communications network.

40. The system of claim 33, wherein said server generates the user's virtual wardrobe based on information received relating to a plurality of apparel items of said user from said client device over said communications network.

41. The system of claim 40, wherein said client device receives a plurality of questions from said server over said communications network and transmits answers entered on said client device by said user to said plurality of questions to said server for generating the user's virtual wardrobe based on the answers, and storing answers and the user's virtual wardrobe in the database.

42. The system of claim 40, wherein said server searches Internet or third-party database for an apparel item that coordinates with said one or more apparel items in the user's virtual wardrobe and transmits information relating to said apparel item from Internet or third-party database to said client device over said communications network.

43. The system of claim 33, wherein said server stores said apparel item in the user's virtual wardrobe if said apparel item received for coordination is acquired by said user.

44. The system of claim 33, wherein said server searches Internet or third-party database for an apparel item that compliments the physical characteristics and the relative bodily proportions/dimensions of said user and transmits information relating to said apparel item from Internet or third-party database to said client device over said communications network.

45. The system of claim 33, wherein said client device is a network enabled device comprising a digital camera.

46. The system of claim 33, wherein said client device is one of the following: a cell phone, a smartphone, a laptop, a netbook, a tablet PC, a mobile wireless device, a personal digital assistant (PDA).

47. The system of claim 33, wherein said server:
  calculates another person's coordination score of an apparel item received for coordination for the other person to determine whether said apparel item for the other person compliments physical characteristics and relative bodily proportions/dimensions of the other person and coordinates with a stored apparel item selected from a virtual wardrobe of the other person by said user;
  generates other person's sliding coordination score and summary based on the other person's coordination score;
  provides a negative recommendation of said apparel item received for coordination for the other person if it is determined that said apparel item received for coordination for the other person does not compliment the physical characteristics and the relative bodily dimensions of the other person based on the other person's sliding coordination score;
  provides a positive recommendation of said apparel item received for coordination for the other person if it is determined that said apparel item received for coordination for the other person compliments the physical characteristics and the relative bodily dimensions of the other person and coordinates with the stored apparel item of the other person selected for coordination by said user based on the other person's sliding coordination score; and
  provides a recommendation of another apparel item from the virtual wardrobe of the other person if it is determined that said apparel item received for coordination for the other person compliments the physical characteristics and the relative bodily proportions/dimensions of the other person but does not coordinate with the stored apparel item selected from the virtual wardrobe of the other person for coordination based on the other person's sliding coordination score.

\* \* \* \* \*